United States Patent
Olczak

(10) Patent No.: US 7,180,672 B2
(45) Date of Patent: *Feb. 20, 2007

(54) OPTICAL SUBSTRATE AND METHOD OF MAKING

(75) Inventor: Eugene Olczak, Pittsford, NY (US)

(73) Assignee: General Electric Company, Schenectady, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 11/019,640

(22) Filed: Dec. 23, 2004

(65) Prior Publication Data

US 2005/0225865 A1    Oct. 13, 2005

Related U.S. Application Data

(63) Continuation-in-part of application No. 10/150,958, filed on May 20, 2002, now Pat. No. 6,862,141.

(51) Int. Cl.
*G02B 27/10* (2006.01)

(52) U.S. Cl. .................... 359/621; 359/561

(58) Field of Classification Search ............. 359/621, 359/561, 625, 626, 599
See application file for complete search history.

(56) References Cited

U.S. PATENT DOCUMENTS

| | | | |
|---|---|---|---|
| 4,542,449 A | 9/1985 | Whitehead | |
| 4,576,850 A | 3/1986 | Martens | |
| 5,005,108 A | 4/1991 | Pristash et al. | |
| 5,303,322 A | 4/1994 | Winston et al. | |
| 5,557,836 A | 9/1996 | Smith et al. | |
| 5,564,870 A | 10/1996 | Benson et al. | |
| 5,769,522 A | 6/1998 | Kaneko et al. | |
| 5,771,328 A | 6/1998 | Wortman et al. | |
| 5,808,784 A | 9/1998 | Ando et al. | |
| 5,851,062 A | 12/1998 | Shinohara et al. | |
| 5,861,990 A | 1/1999 | Tedesco | |
| 5,876,107 A | 3/1999 | Parker et al. | |
| 5,887,964 A | 3/1999 | Higuchi et al. | |
| 5,917,664 A | 6/1999 | O'Neil et al. | |

(Continued)

FOREIGN PATENT DOCUMENTS

JP    55089806 A2    7/1980

(Continued)

OTHER PUBLICATIONS

David J. Whitehouse, Handbook of Surface Metrology, IOP Publishing Ltd. 1994, pp. 49-58.

(Continued)

*Primary Examiner*—Timothy Thompson
*Assistant Examiner*—Jerry Fang
(74) *Attorney, Agent, or Firm*—Foley & Lardner LLP

(57) ABSTRACT

An optical surface substrate. The optical substrate features a three-dimensional surface. The optical substrate is defined by a first surface structure function modulated by a second surface structure function, the first surface structure function producing at least one specular component from a first input beam of light. The second surface structure function has a geometry with at least pseudo-random characteristics to modulate the first surface structure function such that the surface of the optical substrate produces specular and diffuse light from the first input beam of light. The optical substrate is suitable for use in a variety of applications, including brightness enhancement and projection devices.

70 Claims, 35 Drawing Sheets

U.S. PATENT DOCUMENTS

| | | | |
|---|---|---|---|
| 5,919,551 | A | 7/1999 | Cobb, Jr. et al. |
| 5,982,540 | A | 11/1999 | Koike et al. |
| 6,091,547 | A | 7/2000 | Gardiner et al. |
| 6,322,236 | B1 | 11/2001 | Campbell et al. |
| 6,354,709 | B1 | 3/2002 | Campbell et al. |
| 6,356,391 | B1 | 3/2002 | Gardiner et al. |
| 6,456,437 | B1 | 9/2002 | Lea et al. |
| 6,707,611 | B2 | 3/2004 | Gardiner et al. |
| 6,759,113 | B1 | 7/2004 | Tang |
| 6,862,141 | B2 * | 3/2005 | Olczak ............ 359/621 |
| 2003/0035231 | A1 | 2/2003 | Epstein et al. |
| 2003/0058553 | A1 | 3/2003 | Epstein et al. |
| 2004/0109663 | A1 | 6/2004 | Olczak |

FOREIGN PATENT DOCUMENTS

| | | | |
|---|---|---|---|
| JP | 55120001 | A2 | 9/1980 |
| JP | 55120002 | A2 | 9/1980 |
| JP | 2072388 | A2 | 3/1990 |
| JP | 2221926 | A2 | 9/1990 |
| JP | 4303802 | A2 | 10/1992 |
| JP | 5060908 | A2 | 3/1993 |
| JP | 5142422 | A2 | 6/1993 |
| JP | 5173134 | A2 | 7/1993 |
| JP | 2277002 | A2 | 11/1993 |
| JP | 5313004 | A2 | 11/1993 |
| JP | 6018707 | A2 | 1/1994 |
| JP | 6027325 | A2 | 2/1994 |
| JP | 6043310 | A2 | 2/1994 |
| JP | 6082634 | A2 | 3/1994 |
| JP | 6082635 | A2 | 3/1994 |
| JP | 6138308 | A2 | 5/1994 |
| JP | 6148408 | A2 | 5/1994 |
| JP | 6186562 | A2 | 7/1994 |
| JP | 6202107 | A2 | 7/1994 |
| JP | 7104109 | A2 | 4/1995 |
| JP | 7230001 | A2 | 8/1995 |
| JP | 8146418 | A2 | 6/1996 |
| JP | 8160203 | A2 | 6/1996 |
| JP | 8220344 | A2 | 8/1996 |
| JP | 08-313710 | | 11/1996 |
| JP | 8286629 | A2 | 11/1996 |
| JP | 9145932 | A2 | 6/1997 |
| JP | 9304607 | A2 | 11/1997 |
| JP | 2001-183642 | A | 12/1999 |
| JP | 2001-166113 | A2 | 6/2001 |
| WO | WO 99/42861 | | 8/1999 |
| WO | WO 99/63394 | A1 | 9/1999 |
| WO | WO 01/27527 | A1 | 4/2001 |
| WO | WO 01/27663 | A1 | 4/2001 |

OTHER PUBLICATIONS

Max Levy Autograph, Inc. MLA 4000 Series Ultra Precision Micro Machining/Contouring System, Bulletin 2050, Advertisement.

3M Innovation, 3M Brightness Enhancement Film (BEF) III Advertisement.

Backlight Optics, pp. F-2/37-F-2/44.

Machine Design, "Plastic Film Reflects Around the Corner", Aug. 1997, p. 52.

A. Tagaya, Y. Koike, "Highly Scattering Optical Transmission Polymers for Bright Display", pp. 1163-1164.

S.G. Saxe, Solar Energy Materials, "Prismatic Film Light Guides: Performance and Recent Developments", vol. 19, No. 95-109, North-Holland, Amsterdam, pp. 95-109.

* cited by examiner

40 μm Pitch Prism Array

Auto Correlation of a Section along "w" of FIG.18

Moire Map of the 40 μm Pitch Prism Array
of FIG. 18 with a 50μm Reference Prism Array Moire Profile of a section of FIG. 20 along "$w$"

The Prism Array of FIG.18 with +/- 20% Randomness Introduced Into The Horizontal Position of the Prism Centers Auto Correlation of a Section of FIG.22 along "$w$"

Moire Map of The Prism Array of FIG.22
with a 50 μm Reference Prism Array

Moire Profile of FIG. 24 along "$w$"

The Prism Array of FIG.18 with
Full Cycle Randomization with
Superimposed Phase modulated
"Prism Wave Forms"

Auto Correlation of a Section of FIG.26 along "$w$"

Moire Map of FIG.26

Moire Profile of Section of FIG.28 along "$w$"

Moire Map of the 40 μm Pitch Prism Array
Against A 44 μm Pitch Reference Prism Array Moire Map of the 40 μm Pitch Prism Array of FIG.22
Against A 44 μm Pitch Reference Prism Array Moire Map of FIG.26 Against a 44 μm Pitch Reference Prism Array Auto-Correlation of FIG.26 Along "$l$"

Auto Correlation of FIG.22 along "$l$"

Phase modulation example: sin(x/50+10r(x))

Frequency modulation example with spatially varing carrier:
sawtooth($x^2$(5000+10r($x$)) ) *(1000)/($x$+1000)

Frequency and Amplitude modulation example
with spatially varying carrier and noise functions:
r'(x)+sawtooth(x²/(5000+10r(x))) ) *(1000)/(x +1000)

OPTICAL SUBSTRATE AND METHOD OF MAKING

RELATED APPLICATIONS

This application is a continuation-in-part application of U.S. application Ser. No. 10/150,958 filed on May 20, 2002 now U.S. Pat. No. 6,862,141, which is incorporated by reference herein.

BACKGROUND OF THE INVENTION

This invention relates to optical substrates and, more specifically, to optical substrates having a surface performing at least two optical functions.

In backlight computer displays or other systems, films are commonly used to direct light. For example, in backlight displays, brightness enhancement films use prismatic structures to direct light along the viewing axis (i.e., normal to the display), which enhances the brightness of the light viewed by the user of the display and which allows the system to use less power to create a desired level of on-axis illumination. Films for turning light can also be used in a wide range of other optical designs, such as for projection displays, traffic signals, and illuminated signs.

Backlight displays and other systems use layers of films stacked and arranged so that the prismatic surfaces thereof are perpendicular to one another and are sandwiched between other optical films known as diffusers. Diffusers have highly irregular surfaces.

SUMMARY OF THE INVENTION

The invention features a multiple function optical substrate and a method of making the same. Under one aspect of the invention, the optical substrate includes a three-dimensional surface characterized by a function such as a correlation function, R(x,y), having a value of less than about 37 percent (1/e) of the initial value of R within a correlation length, $l_c$, of about 1 cm or less. The three-dimensional surface is defined by a first surface structure function modulated by a second, random, or at least pseudo-random, function. The properties of the first surface structure function produce a specular component from a first input beam of light, and this light turning behavior is retained in the three-dimensional surface. Generally, the pseudo-random function is a signal that modulates any combination of the frequency, height, peak angle or phase of the first surface structure function. A window is defined and points are randomly selected within the window thereby creating a modulation path connecting the randomly selected points. A master function is defined and a surface function is generated along the modulation path and repeatedly combined with a master function at successive locations within the master function. The resulting three-dimensional surface of the substrate retains the light turning characteristics of the first surface structure function, but also diffuses light to, for example, reduce Moiré artifacts.

In another aspect of the invention, the optical substrate is applied to one or more sides of a film used for brightness enhancement in a backlight panel light guide. The optical substrate also produces an on-axis increase in brightness of at least 30 percent in the brightness enhancement application. In addition, the three-dimensional surface produces diffused specular components of light with a power half angle of between about 0.1 and 60 degrees.

In another aspect of the invention, an optical substrate is provided. The optical substrate features a three-dimensional surface. The optical substrate is defined by a first surface structure function modulated by a second surface structure function, the first surface structure function producing at least one specular component from a first input beam of light. The second surface structure function has a geometry with at least pseudo-random characteristics to modulate the first surface structure function such that the surface of the optical substrate produces specular and diffuse light from the first input beam of light. The optical substrate is suitable for use in a variety of applications, including brightness enhancement and projection devices.

DETAILED DESCRIPTION OF THE INVENTION

The embodiments of the invention provide an optical substrate for turning and diffusing light using the surface thereof. The substrate includes a surface defined by a first surface structure function for turning light and a second surface structure function for diffusing light. The combination of these two surface functions results in a single three-dimensional surface that both turns and diffuses light.

Embodiments of substrates will be described below with respect to brightness enhancing films for use in backlight displays or the like. The optical substrates, however, can be used in a wide variety of other applications as well.

Figure 1:
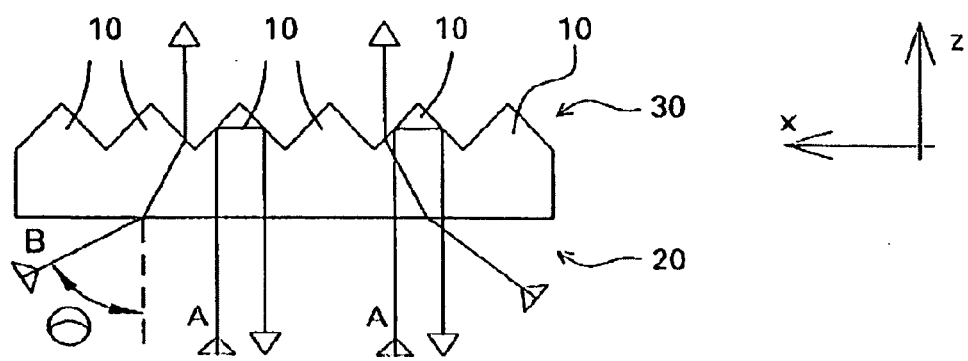
FIG. 1 is a cross-sectional view of a prior art film in which a series of prismatic structures are used to turn light.

FIG. 1 depicts in cross section a prior art film in which a series of prismatic structures 10 are used to turn light. In backlight displays, light enters surface 20 and exits surface 30. In the film of FIG. 1, a beam of light, A, having a zero degree angle of incidence to the light-entering surface 20 is directed off the prism structures 10 and is, essentially, reflected back toward the input. A second beam of light, B, having an angle of incidence of θ is turned by the prismatic structures 10 so that it is transmitted through the light-exiting surface 30 and exits substantially normal to the light-entering surface 20. Other beams (not shown) will turn or reflect at other angles. The bulk statistical properties of such a film are characterized by parameters such as optical gain and viewing angle.

In this prior art film, the surface 30 can be described as a function. If the height of the surface 30 relative to surface 20 is coordinate z and the coordinates across the page and normal to the page are x, y respectively, then the surface 30 can be defined by a function $z=f(x,y)$. In this case, $f(x)$ is a repeating triangular waveform, or sawtooth, with a constant offset relative to surface 20. In this case, the function defining surface 30 has a special geometry that both turns and reflects light as outlined above.

Figure 2:
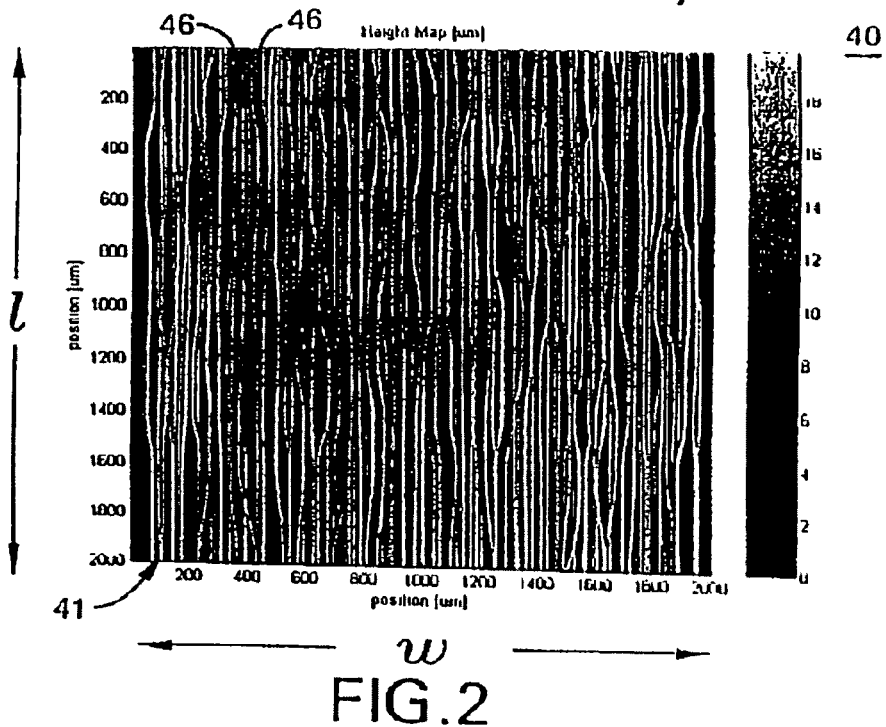
FIG. 2 is a top view of an optical substrate according to one embodiment of the invention.
Figure 3:
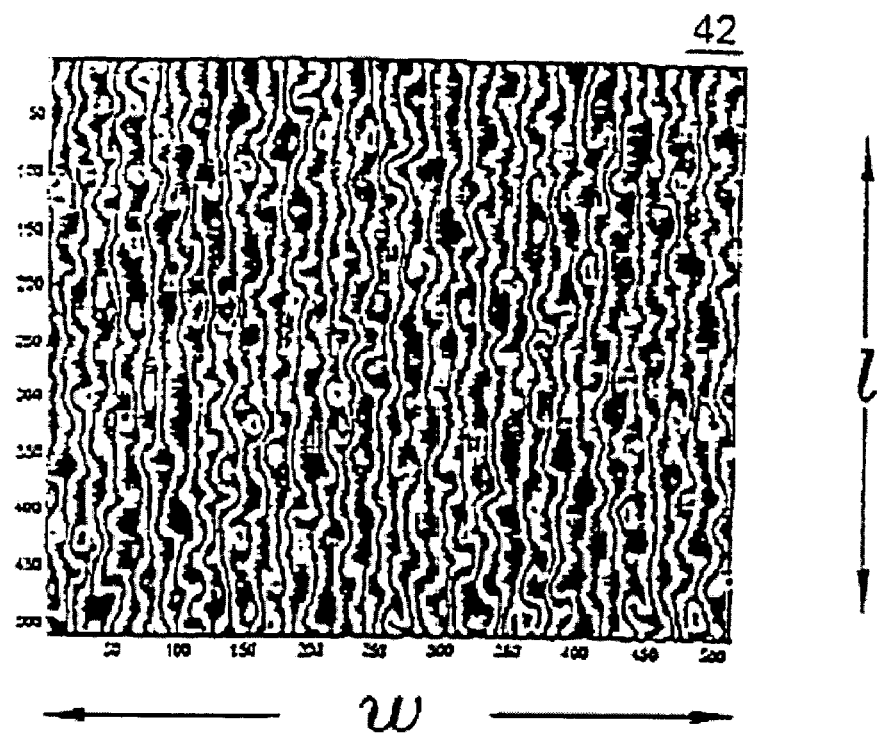
FIG. 3 is a top view of a second optical substrate according to another embodiment of the invention.
Figure 4:
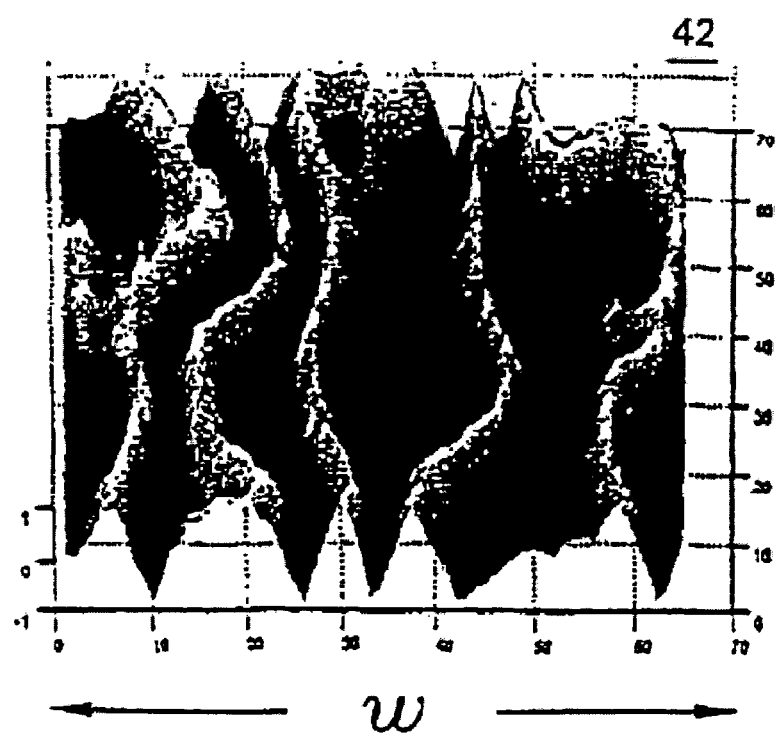
FIG. 4 is a perspective view of the optical substrate of FIG. 3.

FIG. 2 is a top view of an optical substrate 40 according to a first embodiment of the invention. The embodiment of FIG. 2 shows a portion of a substrate 40 that has a length, l, of about 2,000 microns and a width, w, of about 2,000 microns. FIG. 3 is a top view of an embodiment of a portion of a substrate 42 that is about 500 microns by 500 microns in dimension, and FIG. 4 shows a perspective view of a portion of the substrate 42 of FIG. 3. The embodiments of FIGS. 3 and 4 have a three-dimensional surface that is more highly irregular than the three-dimensional surface of FIG. 2. Generally, the substrates shown in FIGS. 2–4 have an irregular three-dimensional surface structure on the light-exiting surface thereof. Because of its geometry, the irregular three-dimensional surface structure, turns light to produce output specular components, while at the same time diffusing light and having a low correlation length, $l_c$. Because the embodiments of the substrates can turn and diffuse light on a single surface, separate diffusion surfaces can be eliminated in some applications.

The substrates shown in FIGS. 2–4 have an irregular three-dimensional surface. This irregular surface, however, is not easily defined by well known mathematical functions, as is the case for the light exiting surface 30 of FIG. 1. Instead, this surface function is better defined as the result of modulating a first surface structure function by a second surface function, and in some cases by taking such modulated functions and superimposing them with other functions formed similarly. For example, the first function can be similar to that defined by the light exiting surface 30 of FIG. 1. The first function may also be that of a single prism. The second function can be a pseudo-random function of height, phase, frequency or peak angle. Moreover, the combination can be accomplished by way of modulating the first function by the second function so that the resulting function $z=f(x,y)$ of substrate 40 has a pseudo-randomly varying height, phase, frequency or peak angle along the "l" direction of the substrate 40 (FIG. 2). The first function provides the geometrical properties to turn or reflect light and the second function provides the geometrical properties to diffuse the turned light or reflected light. As will be discussed below, other functions can be substituted and other parameters can be relevant (e.g., the phase of an entity). If a prismatic surface function is used as the first function, the height, h, width, s, and peak angle, α, of the first surface function can vary depending on the intended use of the substrate. In addition, the first surface function need not be the symmetric structures as shown in FIG. 1.

In one embodiment, the first surface structure function is modulated in phase, frequency, peak angle or height by the second surface structure function. The second surface structure function defines the type of modulation, to produce the three-dimensional surface of the film on the light-exiting surface 41 (FIG. 2) of the substrate 40. The surface height of the light-exiting surface 41 of the substrate 40 is therefore defined by the combination of these two surface structure functions. For example, the height of the peak of one or more of the first surface structure functions, eg., prisms can be modulated along the length l of the substrate 40. The height can be randomly or pseudo-randomly modulated between certain limits at random or fixed intervals along the length, l, of the substrate 40. As best understood, the term random means true randomness or randomness to the extent possible when generated by human means, e.g., pseudo-randomness. In another example, the phase, i.e., the horizontal position along the width w of the substrate 40, of one or more of the first surface structure functions can be modulated, at least pseudo-randomly between certain limits along the length, l, of the substrate 40. In yet another example, the peak angle of the first surface structure function can be modulated along the length l of the substrate 40. Thus, a combination of modulation techniques can be used to create the three-dimensional surface of the substrate 40 so that the single three-dimensional surface turns and diffuses light. The specific modulation techniques used to produce the substrate 40 depicted in FIG. 2 will be described in greater detail below.

Figure 5:
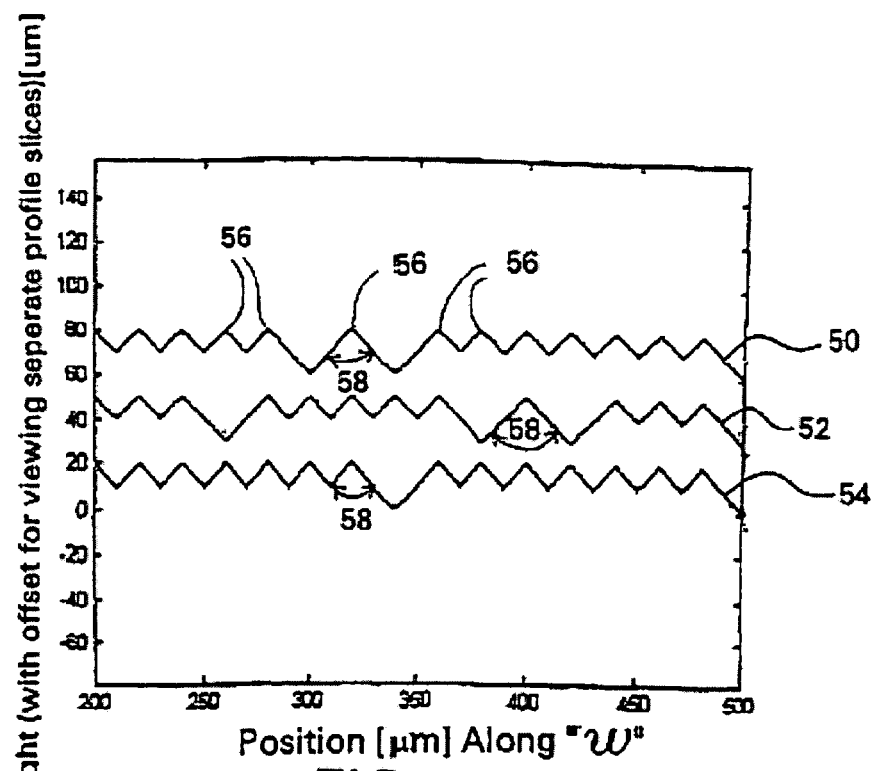
FIG. 5 is a graphical representation showing three cross-sectional views of an optical substrate according to one embodiment of the invention.

FIG. 5 is a graphical representation showing three cross-sections of a substrate 40 in different positions along the length "l" of FIG. 2. A first cross-section 50, taken at, for instance, the position of 400 microns along the "l" direction of FIG. 2, could extend for a portion of the width w of the substrate 40 (specifically, between about 200 and 500 microns in the "w" direction). The second cross-section 52 could be taken, for example, at the position of 800 microns along the "l" direction of FIG. 2, and the third cross-section 54 could be taken, for example, at the position of about 1400 microns along the "l" direction in FIG. 2. The vertical axis in FIG. 5 is meant to show only an amount of variation in the height of the surface of substrate 40 and not the actual height of the substrate 40. The horizontal axis in FIG. 5 shows the horizontal position along the w direction in FIG. 2. As can be seen in the cross-sections of FIG. 5, modulated sawtooth functions continue to exist at specific cross-sections 50, 52, and 54 of the substrate 40. Because the phase of these structures has been modulated, however, each cross-section 50, 52, 54 has peaks 56 that are not in alignment with the other cross-sections 50, 52, 54. This is also evident from the top view of FIG. 2, in which the modulated surface functions 46 extending the length l of the substrate 40, tend to sway, turn, combine or bifurcate, and cross in such a way that there are no discrete elements. In FIG. 5, the peak angles 58 of the sawtooth functions are about 90 degrees. Although FIG. 5 does not show modulated peak angles of the sawtooth functions, these peak angles could also vary from one peak to the next along the generally longitudinal direction "l" of FIG. 2 for a given optical element 46. The peak is the local height maxima on the resultant surface cross section in the w direction.

Even after the first surface structure function is modulated to produce the three-dimensional surface of the substrate 40, the characteristics of the first surface structure function that produce output specular components from input beams of light are largely retained in the resulting three-dimensional surface. The amount of specular behavior, or light turning behavior, is tunable by altering the amplitude and/or spatial frequency modulation applied to the first surface structure function. For instance, reducing the amount of modulation applied to the first surface structure function increases specular behavior. In contrast, an increase in the amount of modulation applied to the first surface structure function decreases specular behavior, but increases diffusion. Similarly, a reduction in the amount of modulation applied to the first surface structure function also decreases the diffuse behavior of the substrate, and an increase in the amount of modulation applied to the first surface structure function increases the diffuse behavior of the substrate.

Figure 6:
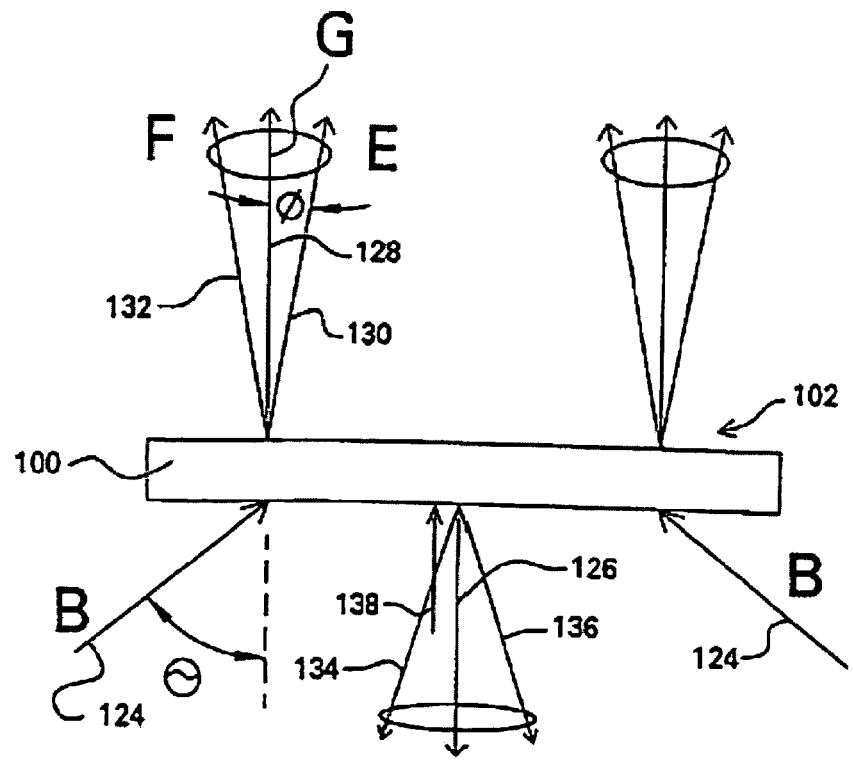
FIG. 6 is a cross-sectional view of an optical substrate according to one embodiment of the invention showing the turning and diffusing of light beams.

FIG. 6 shows the turning and diffusing properties of an exemplary embodiment of an optical substrate 100 that can be used for brightness enhancement applications. For clarity in FIG. 6, the irregular three-dimensional surface 41 of FIG. 2 is not shown, but would be present if shown as light-exiting surface 102 with characteristic surface dimensions of from about 100 mm to about 1 nm. A first beam of light, 138, having a zero degree angle of incidence, θ, to the substrate 100 is directed back by the light-exiting surface 102 toward the input. The light is not only directed back, but it is diffused so that, instead of a single output beam being formed, there is a first diffusion ellipse formed by rays 136 and 134. Diffused light can, for instance, exist within the ellipse formed by rays 136 and 134 so that a solid ellipse is formed. A second input beam of light, 124 having an input angle of incidence of θ is directed by the substrate 100 so that it is transmitted through to the light-exiting surface 102 as exit beam 128 and is turned so that it exits generally normal to the substrate 100. Beam 128 is also diffused by light-exiting surface 102 so that a second diffusion ellipse is formed. The second diffusion ellipse is formed by the power half angle Φ between 128 and rays 130 or 132. The power half angle Φ, which can be used as one measure of the diffusion characteristics of the substrate 100, can vary between about 0.1 and 60 degrees. In other embodiments, by altering the type and/or amount of modulation, the power half angle Φ can be between about 1 and 5 degrees. FIG. 6 shows that at least one output beam 130, 132 of light is turned by the substrate 100 and deviates from its input angle of incidence θ.

The diffusion characteristics of the substrate 100 of FIG. 6 can vary widely. For example, the diffusion ellipses formed can be symmetric cones in one embodiment. In other embodiments, the diffusion can have no symmetry at all or can have very little symmetry. The random modulation can be controlled to effect diffusion in the w and l directions differently i.e., the amplitude, bandwidth and the modulation parameter is applied to can be one dimensional along either the w or l direction, or two dimensional with different parameters along w, l. Other coordinates could be used to change the orientation of the modulation function with respect to the first surface function, including other rotated or shifted Cartesian geometries, such as cylindrical, spherical or generally warped coordinate systems. These may be used when an asymmetric light pattern is desired.

Figure 7:
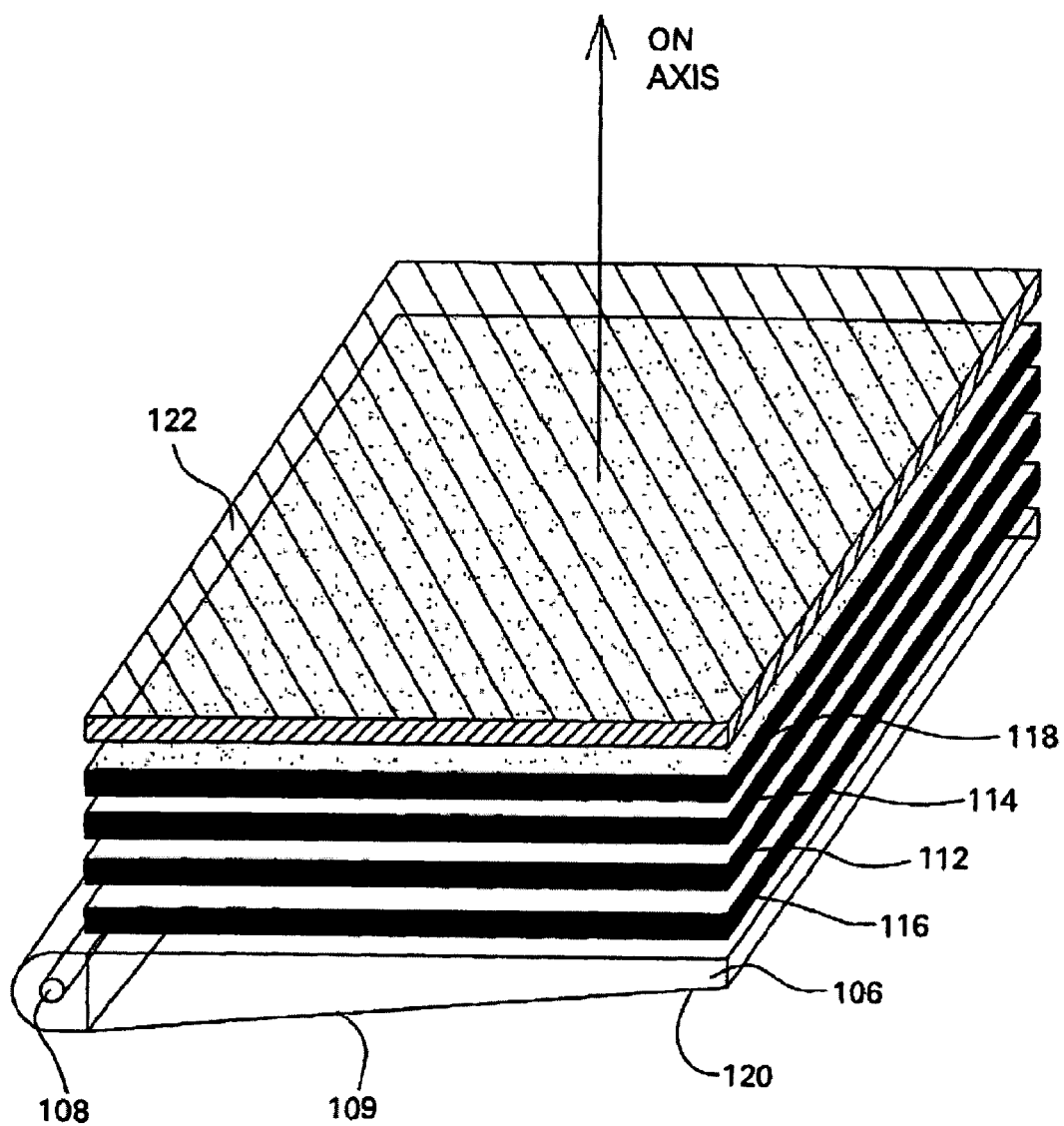
FIG. 7 is a perspective view of a flat panel display.

The light directing characteristics of the substrate can also vary widely. Referring to FIG. 7, if used with a light guide 106 of a backlighting unit having a lamp 108 and lower reflective surface 109, substrates 112 and 114 can increase brightness substantially, while also diffusing light. In brightness enhancement embodiments, the substrates 112 and 114 can increase brightness as viewed on-axis by about 30 percent to about 300 percent. Prior art linear prism arrays as well as brightness enhancement films with randomized prism arrays, cannot be used, or it is undesirable to use such arrays, in parallel because of Moiré effects. With this invention two substrates can be used at any angle with respect to one another between crossed (orthogonal) and parallel, because of the lack or Moiré effects. This allows for greater flexibility in the light output pattern. In other embodiments, the substrate increases on-axis brightness by at least 50 percent and by perhaps as much as about 200 percent. In brightness enhancement embodiments, the two substrates 112, 114 can be arranged to be orthogonal to one another in order to turn and diffuse input beams of light from different directions. Because diffusion behavior is built into the substrates 112, 114, separate diffusion substrates need not be used to eliminate Moiré artifacts caused by the substrates 112, 114, although a diffusion substrate can be used within the scope of the invention for other reasons.

Prior art FIG. 7 shows diffusers 116, 118. Diffuser 118 diffuses Moiré artifacts resulting from interference caused by any inherent regularity of substrates 112, 114. Diffuser 116 diffuses Moiré artifacts due to the regularity of an extractor pattern on the underside 120 of light guide 106 and the regularity of LCD panel 122. Conventional brightness enhancement films 112, 114 can be replaced with the current invention possibly eliminating thereby diffusers 118 and 116.

The diffusion characteristics of the substrates 112, 114 reduce or eliminate Moiré artifacts caused by many common light directing films, such as that shown in FIG. 1. Exemplary films incorporating these substrates, therefore, can turn and diffuse light on one surface so that Moiré artifacts are reduced or eliminated.

The autocorrelation function, R(x,y), is a measure of the randomness of a surface that is used in surface metrology. Over a certain correlation length, $l_c$, however, the value of an autocorrelation function, R(x,y), drops to a fraction of its initial value. An autocorrelation value of 1.0, for instance, would be considered a highly or perfectly correlated surface. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length. A more detailed discussion of the auto-correlation function is provided in David J. Whitehouse, Handbook of Surface Metrology, IOP Publishing Ltd. (1994), p. 49–58.

In some embodiments of the invention, the value of the autocorrelation function for the three-dimensional surface of the optical substrate 100 drops to less than or equal to 1/e of its initial value in a correlation length of about 1 cm or less.

In still other embodiments, the value of the autocorrelation function drops to 1/e of its initial value in about 0.5 cm or less. For the embodiment of the substrate 40, 100 shown in FIGS. 2 and 6, the value of the autocorrelation function along the length l drops to less than or equal to 1/e of its initial value in about 200 microns or less. For the same embodiment of FIGS. 2 and 6, the value of the autocorrelation function along the width w drops to less than or equal to 1/e of its initial value in about 11 microns or less.

The correlation length is related to the reduction of Moiré artifacts. As noted, smaller correlation length indicates a more random surface than a larger correlation length, and this smaller correlation length also relates to greater diffusion and the reduction of Moiré artifacts. Because the three-dimensional surface of the substrates 40, 100 are highly irregular, as indicated by the low correlation length, the substrates 40, 100 can be effective to reduce Moiré artifacts.

The following discussion is intended to provide some illustration of the anti Moiré properties of the present invention. In the following examples it will be shown that 1) the invention has much lower auto correlation than both straight prisms and randomized prism structures 2) auto correlation length is a good indicator as to the possibility that a structure will produce Moiré patterns in a system.

Figure 18:
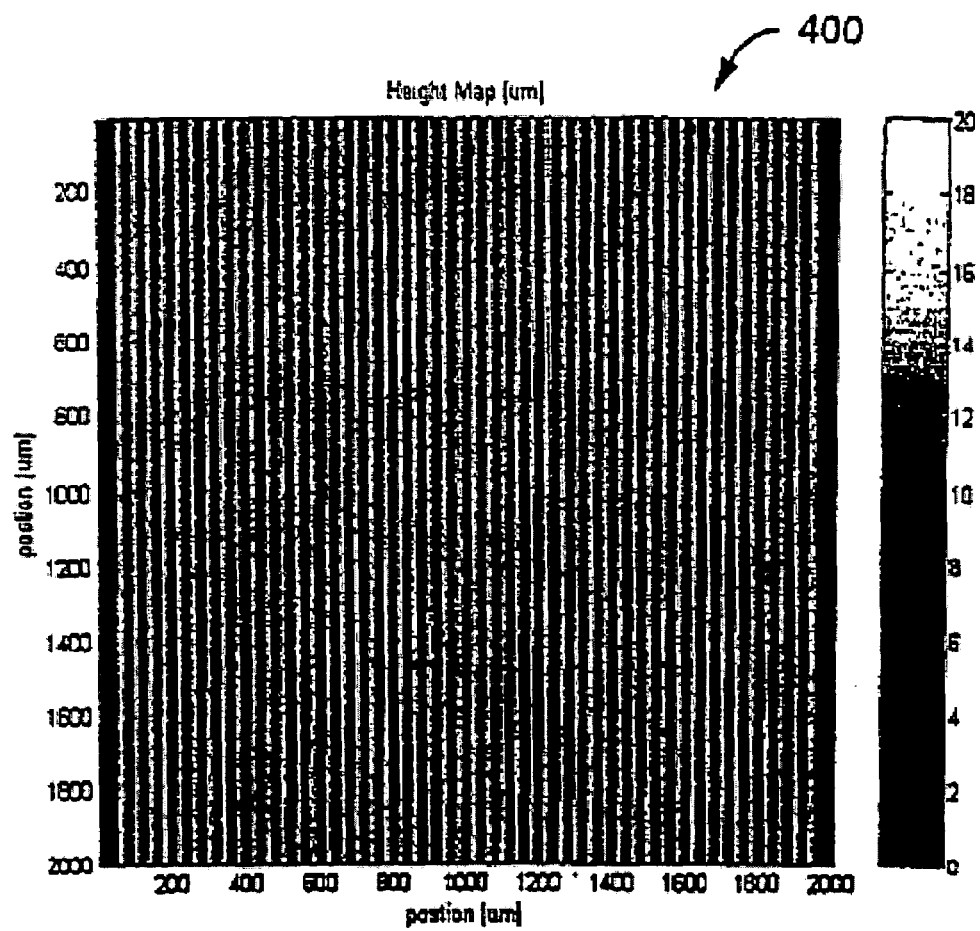
FIG. 18 is the top view of a height map of a 40 um pitch prism array.
Figure 19:
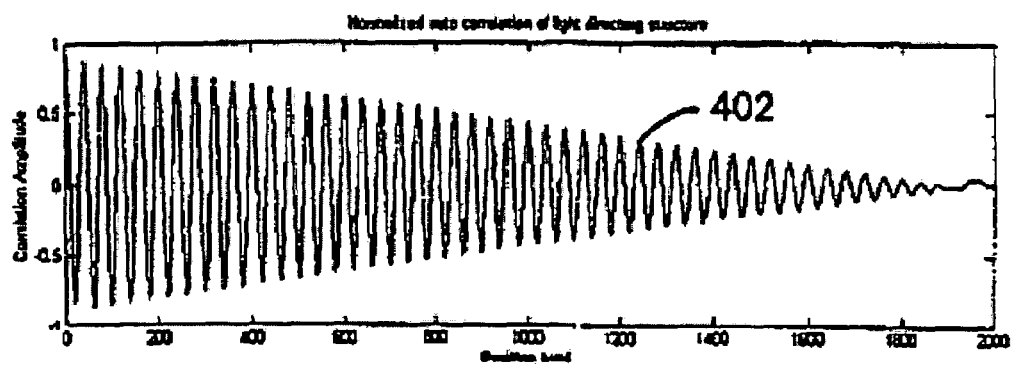
FIG. 19 is a normalized auto correlation function of a horizontal section of the 40 um pitch prism array of FIG. 18.

Consider the 20 um tall, 40 um pitch straight prism array 400 of FIG. 18 as a baseline. The auto-correlation function 402 of a horizontal profile taken through the prism structure 400 along the w direction is shown in FIG. 19. The attenuation of the auto correlation function 402 is an indicator of the randomness of the structure. The structure in FIG. 18 is completely ordered and therefore the only attenuation is due to the finite extent of the sample. We must consider this roll off of the envelope of the sinusoidal auto correlation function when comparing to other examples.

Figure 20:
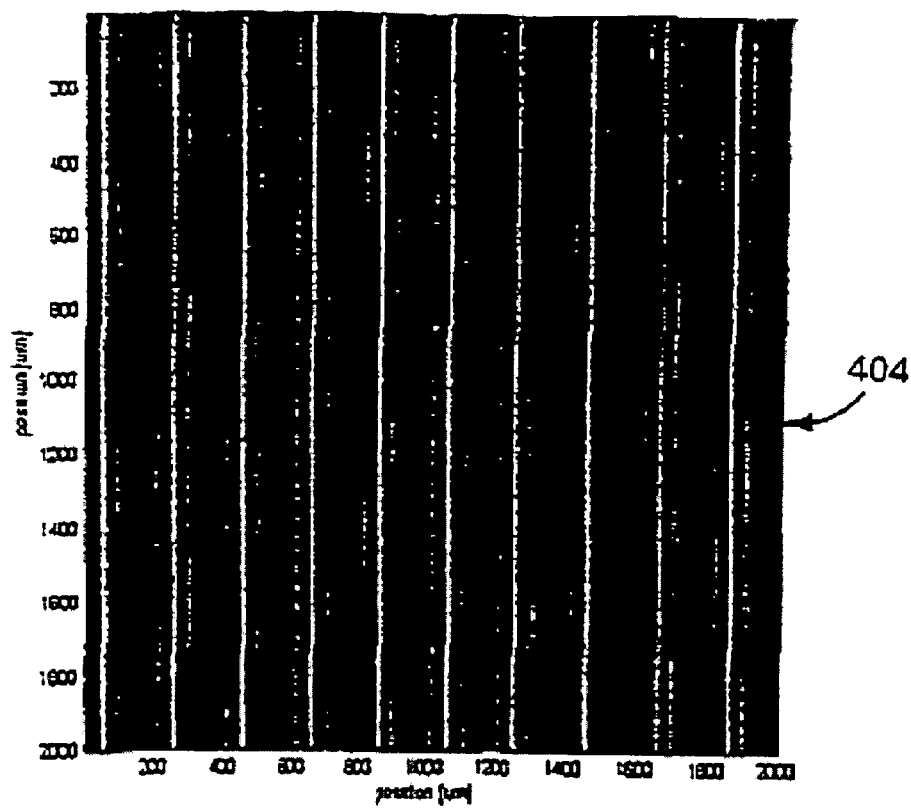
FIG. 20 is the top view of a Moiré map of the 40 um pitch prism array of FIG. 18 with a 50 um pitch reference prism.

FIG. 20 shows a Moiré map 404. For the prism structure 400 of FIG. 18, the Moiré map in FIG. 20, is the image produced by multiplying the height (although, it doesn't have to be height that is modulated) maps of the structure of FIG. 18 by that of a reference prism structure of similar pitch. This is similar to what happens when two structures are placed in closed proximity in an optical system (or one is imaged onto another). The reference prism structure is a 50 um pitch prism array oriented parallel to that of the prism structure 400 of FIG. 18. This is the worst-case scenario for introducing Moiré.

Figure 21:
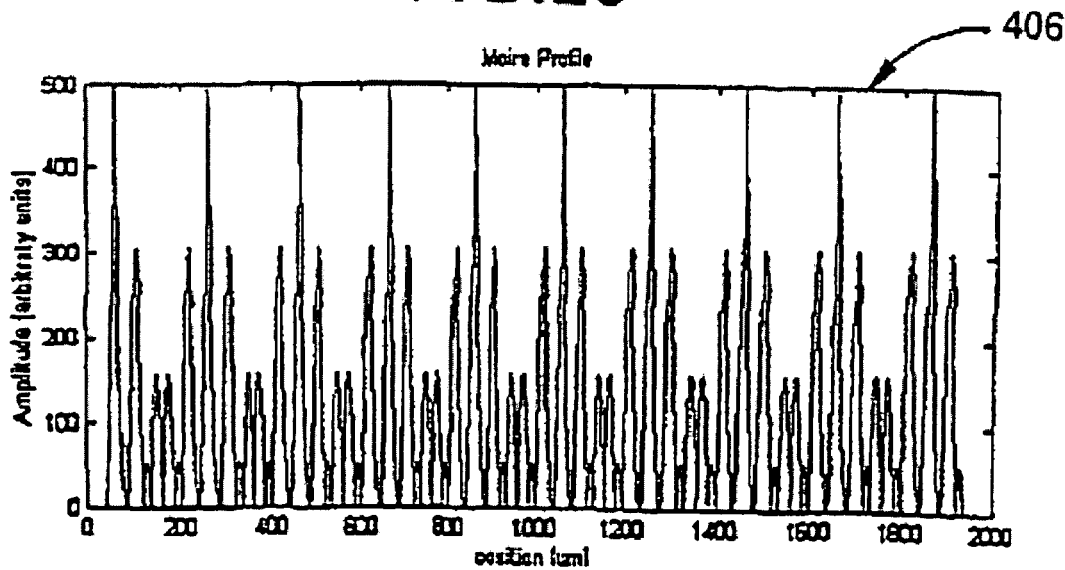
FIG. 21 is a profile of the Moiré map of FIG. 20.

A Moiré plot is shown in FIG. 21 at 406. This is a profile of the Moiré map 404 of FIG. 20 along the w direction. Note that for the 40 um pitch prism of FIG. 18, the Moiré map of FIG. 20 and the Moiré plot of FIG. 21 both show a strong beat pattern as a low frequency envelope.

Figure 22:
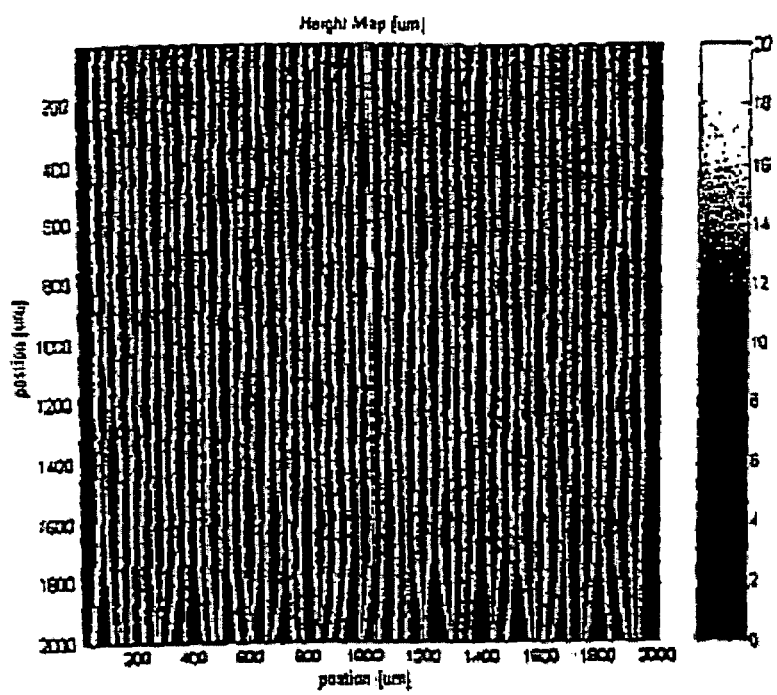
FIG. 22 is the top view of a height map of the 40 um pitch prism array of FIG. 18 with randomization in the horizontal position of the prism centers.

Next consider the 40 um pitch prism array of FIG. 18 with +/−20% randomness introduced into the horizontal position (w direction) of the prism centers resulting in random variations along each prism in the vertical, or l direction as shown at 408 in FIG. 22.

Figure 23:
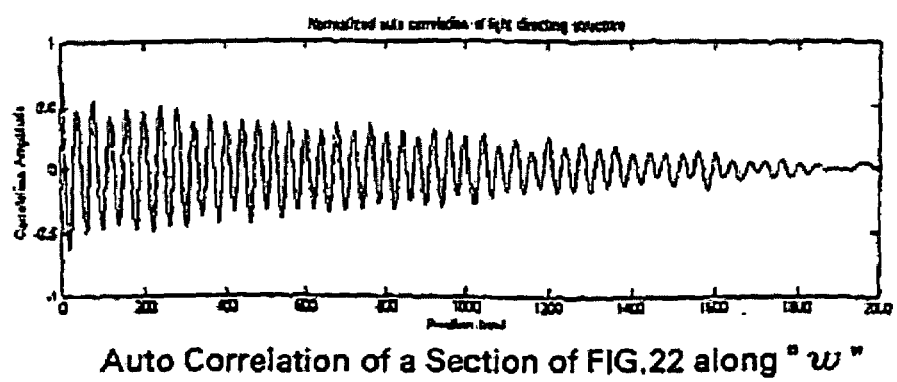
FIG. 23 is a normalized auto correlation function of a horizontal section of the height map of FIG. 22.

Note now in FIG. 23, the somewhat more rapid attenuation of the auto correlation. This is due to the introduction of the randomness to the prism 40 um pitch prism array. In the Moiré map 412 of FIG. 24 and the profile 414 thereof in FIG. 25, the beat pattern is somewhat scrambled but still visible. As in FIG. 19, the attenuation of the autocorrelation in FIG. 23 is due to the finite extent of the sample.

Figure 26:
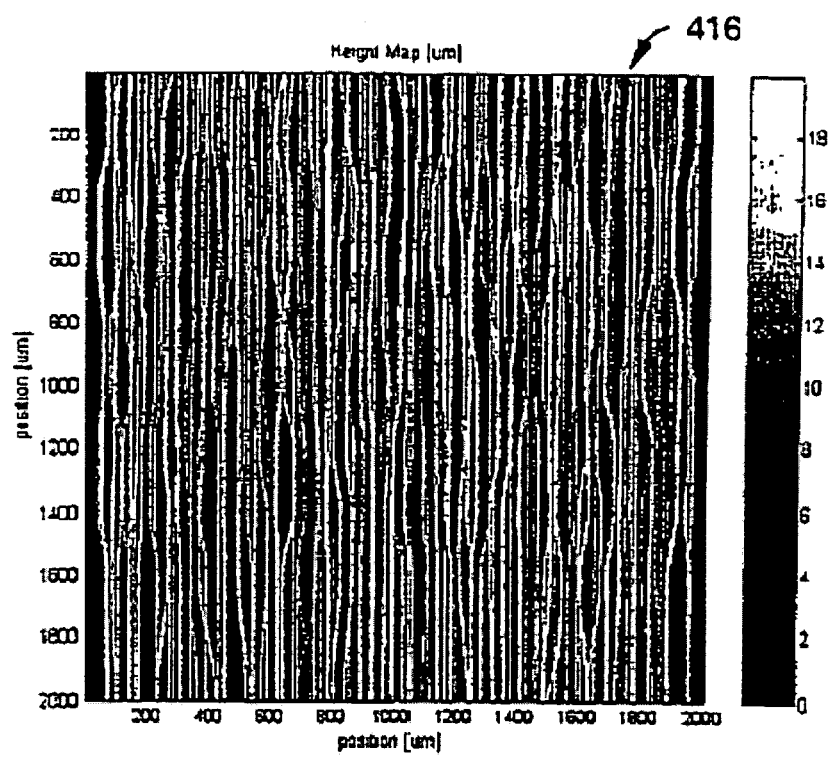
FIG. 26 is the top view of a height map of the 40 um pitch prism array of FIG. 18 with full cycle randomization in the horizontal-position of the prism centers with superimposed phase modulated prism wave forms.

Consider next one embodiment of the present invention as shown at 416 in FIG. 26. This structure has full cycle (e.g., greater than 100% of the "pitch") randomization along with superimposed phase modulated "prism wave forms" with heights between 20 um and 10 um and slopes between 40 and 50 degrees. In this case that randomness and superposition used results in bifurcating (or splitting) and merging structures or elements.

Figure 27:
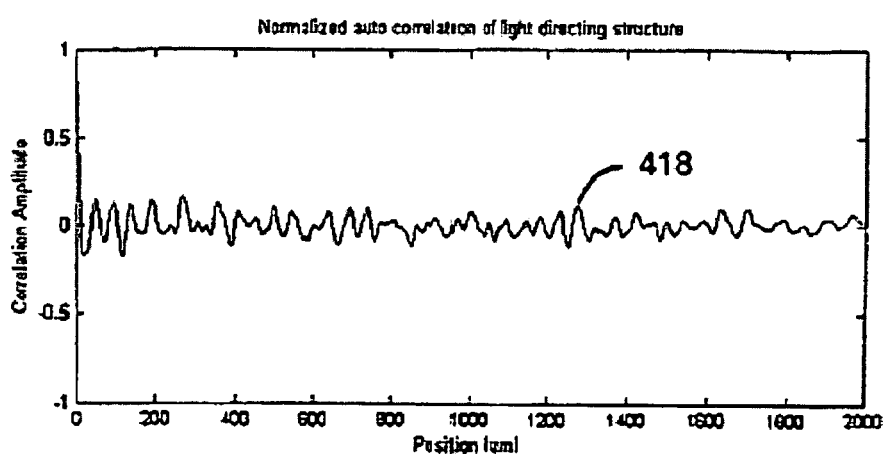
FIG. 27 is a normalized auto correlation function of a horizontal section of the height map of FIG. 26.
Figure 28:
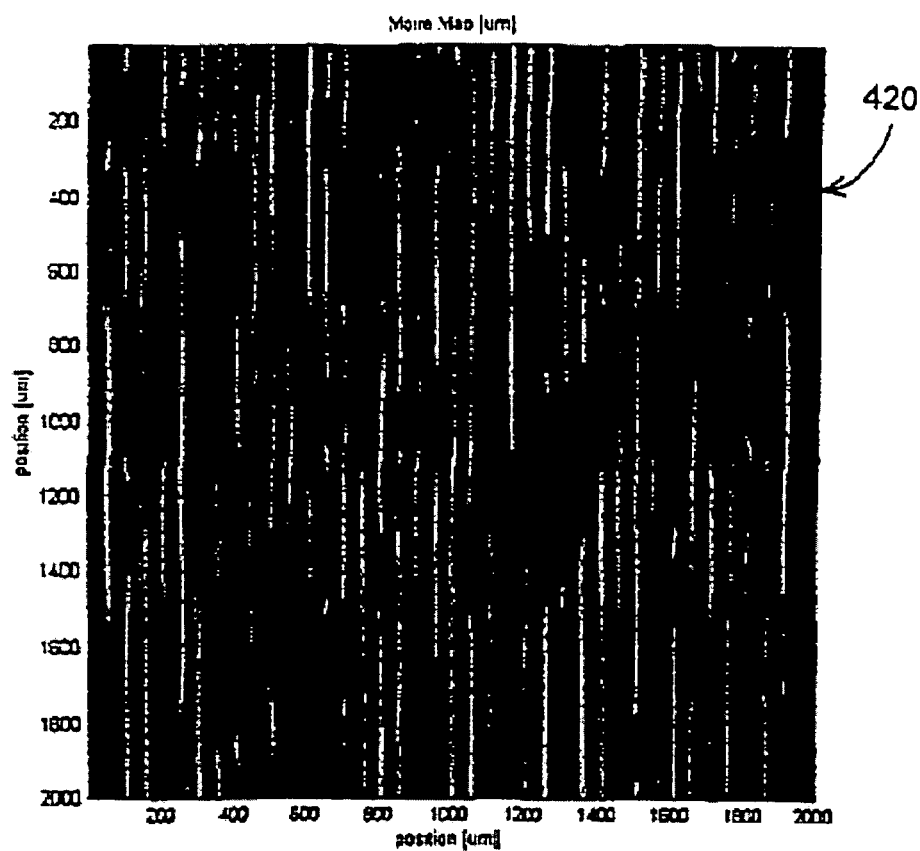
FIG. 28 is the top view of a Moiré map of the height map of the 40 um pitch prism array of FIG. 26.
Figure 29:
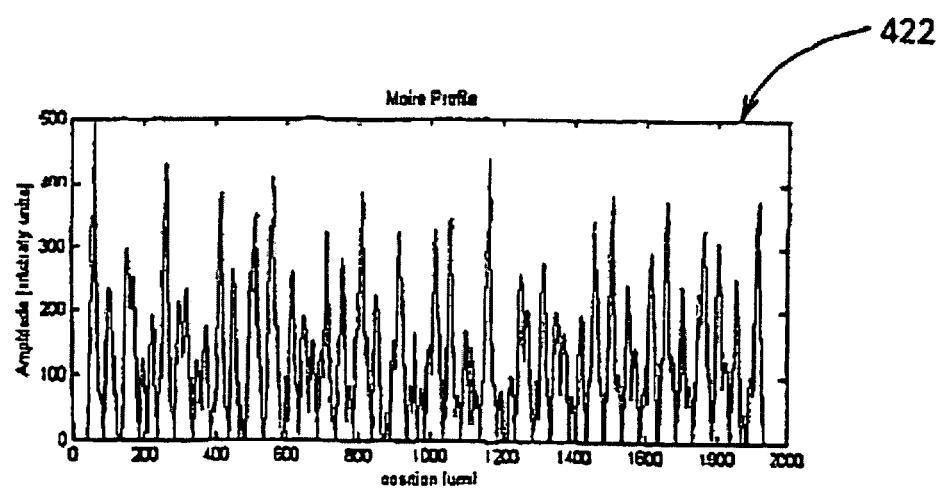
FIG. 29 is a profile of the Moiré map of FIG. 28.
Figure 30:
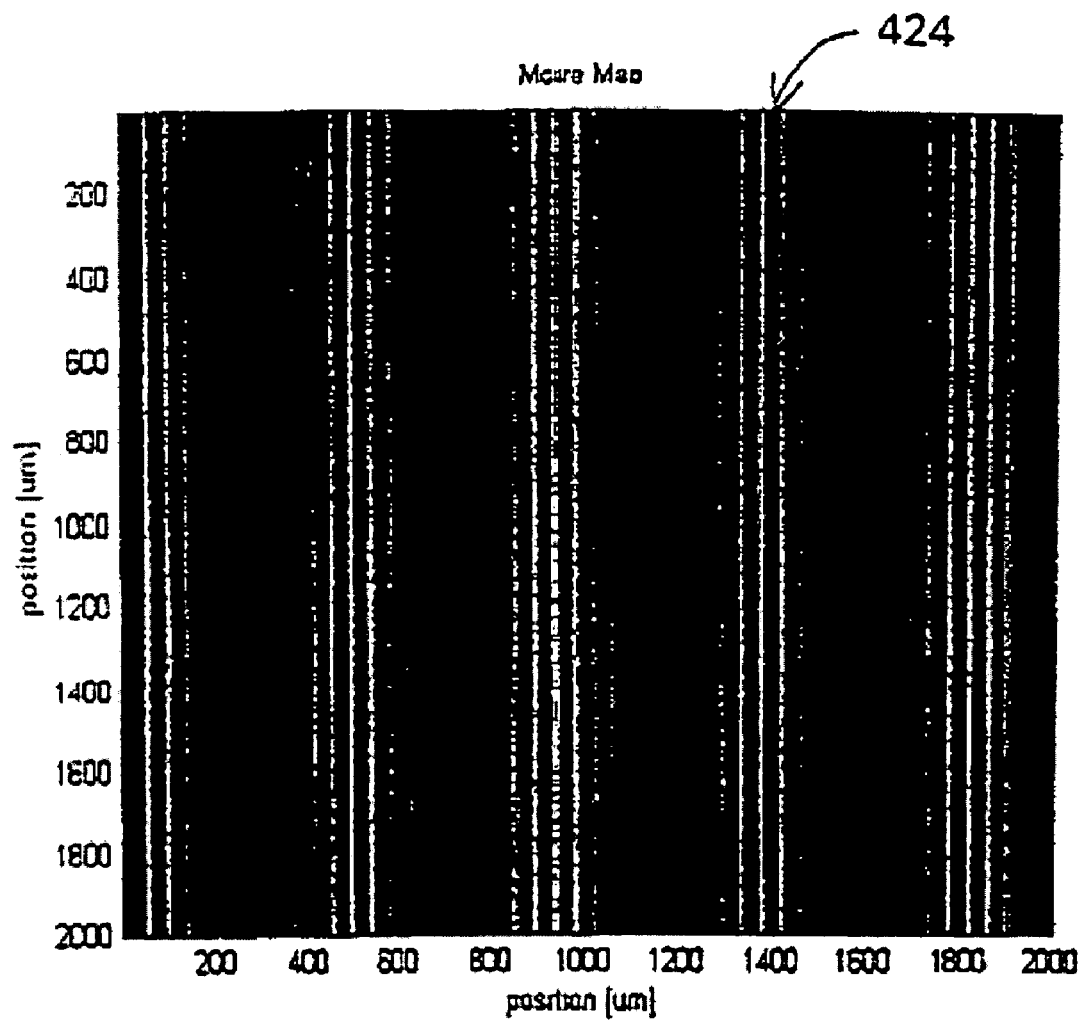
FIG. 30 is the top view of a Moiré map of a 40 um-pitch prism array with a 44 um pitch prism array.
Figure 31:
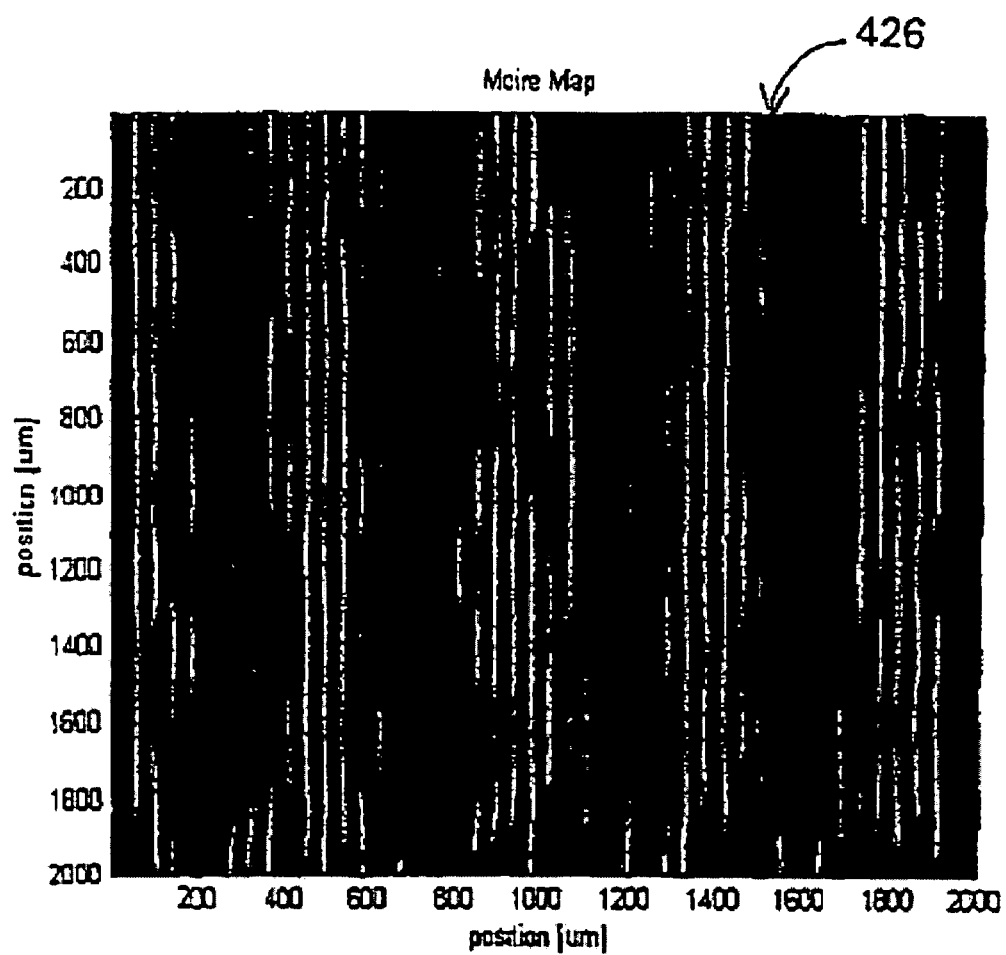
FIG. 31 is the top view of a Moiré map of a 40 um pitch prism array with randomization in the horizontal position of the prism centers with a 44 um pitch prism array.
Figure 32:
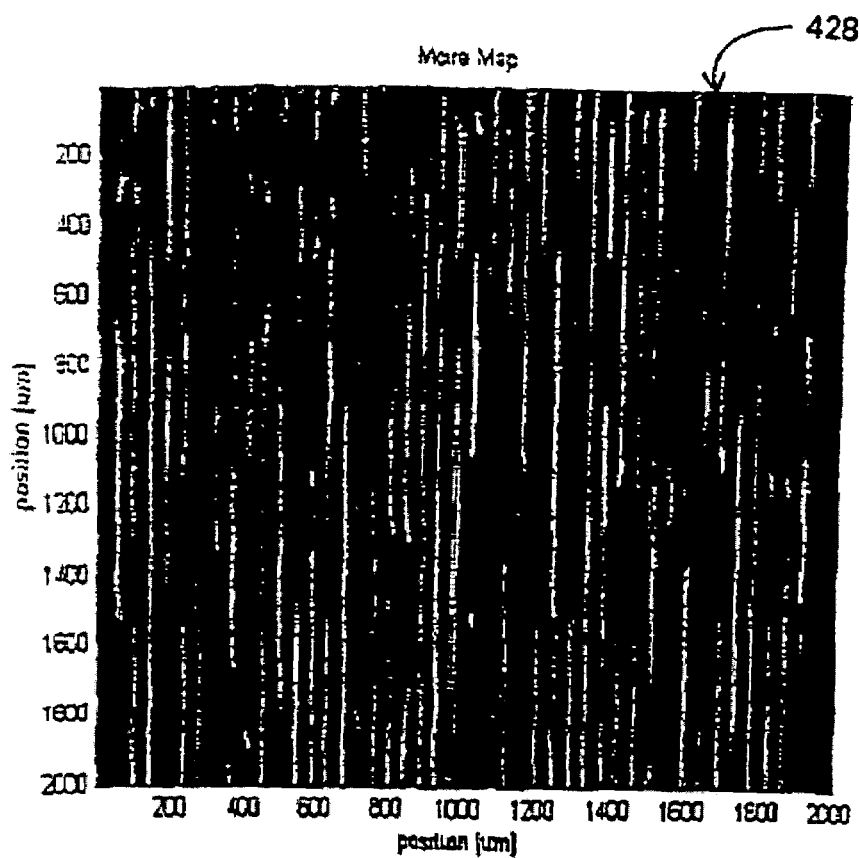
FIG. 32 is the top view of a Moiré map of the height map of FIG. 26 against a 44 um pitch reference prism array.

Note that, as shown in FIG. 27, the auto-correlation function of a profile 418 of FIG. 26 drops very rapidly compared to those of FIGS. 19 and 23 (e.g., to less that 0.2 in under 100 um). Thus, it should be expected that the anti Moiré performance of FIG. 26 is better than in FIGS. 18 and 22. This is shown at 420 and 422 in FIGS. 28 and 29. The beat frequency is entirely absent and all that remains is areas of non-uniformity. As seen in FIG. 29, these small non-uniformities are associated with the local structure of the invention and not the result of a beat pattern. The consequence of this is illustrated in FIGS. 30, 31 and 32. Here the Moiré maps are produced by using a 44 um pitch reference prism array. Note that for the straight prism of FIG. 18 and the 20% randomized prism of FIG. 22, the beat pattern is at a lower spatial frequency (fewer cycles across the map).

Figure 24:
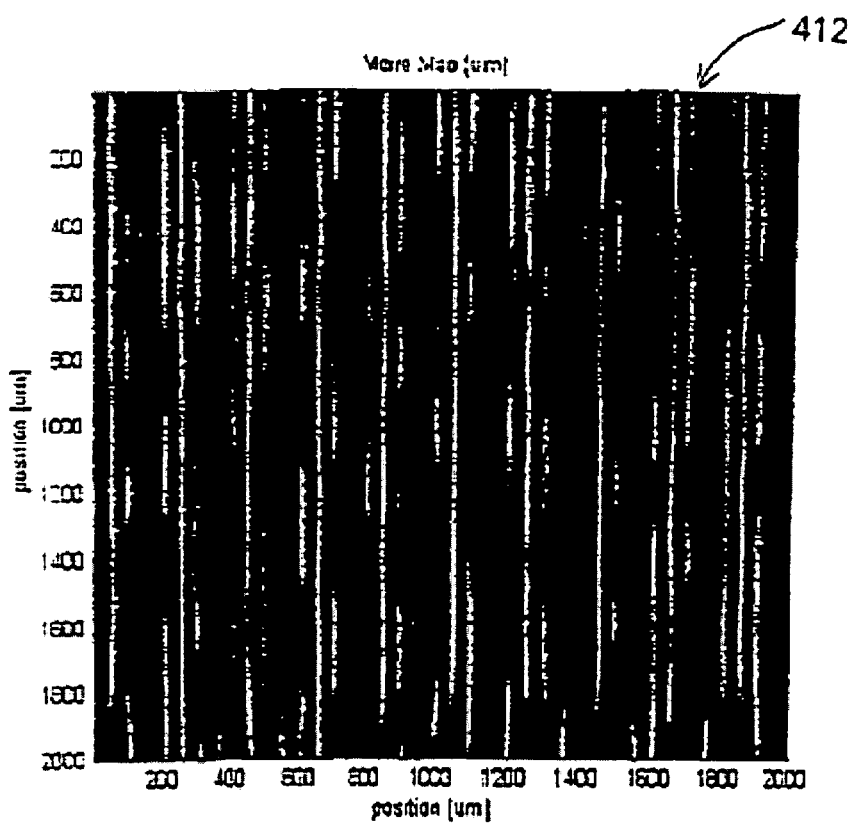
FIG. 24 is the top view of a Moiré map of the height map of FIG. 22.
Figure 25:
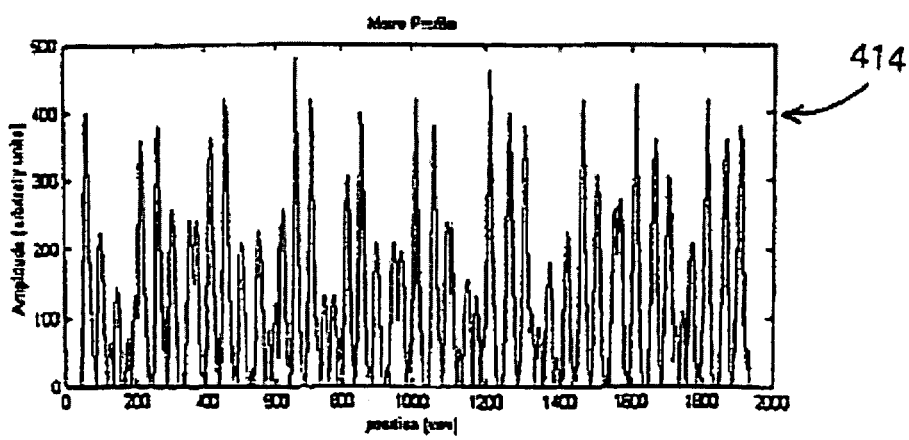
FIG. 25 is a profile of the Moiré map of FIG. 24.

In contrast the non-uniformities for the map of FIG. 26 are similar to those in FIG. 24. Since the non-uniformities are always on the same scale as the structure, they will not be visible in the display and are of no concern (if the design pitch is fine enough). Moiré in the former examples is far more problematic because the beat pattern can have a period that is a large multiple of the prism pitch and may result in easily visible artifacts.

Figure 33:
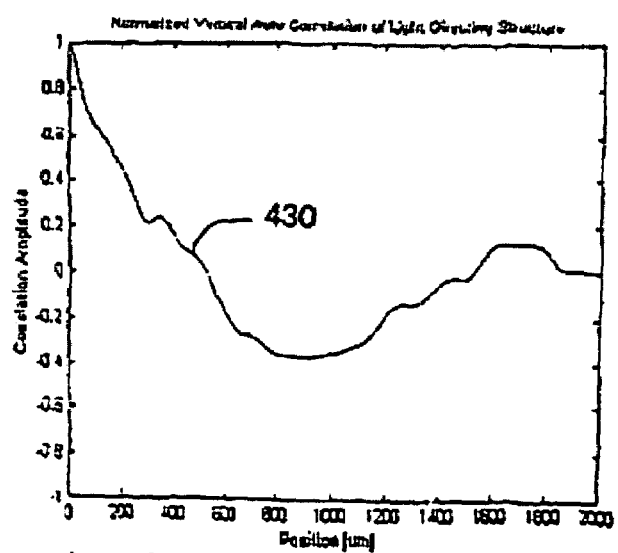
FIG. 33 is the vertical auto correlation of the height map of the 40 um pitch prism array of FIG. 26.
Figure 34:
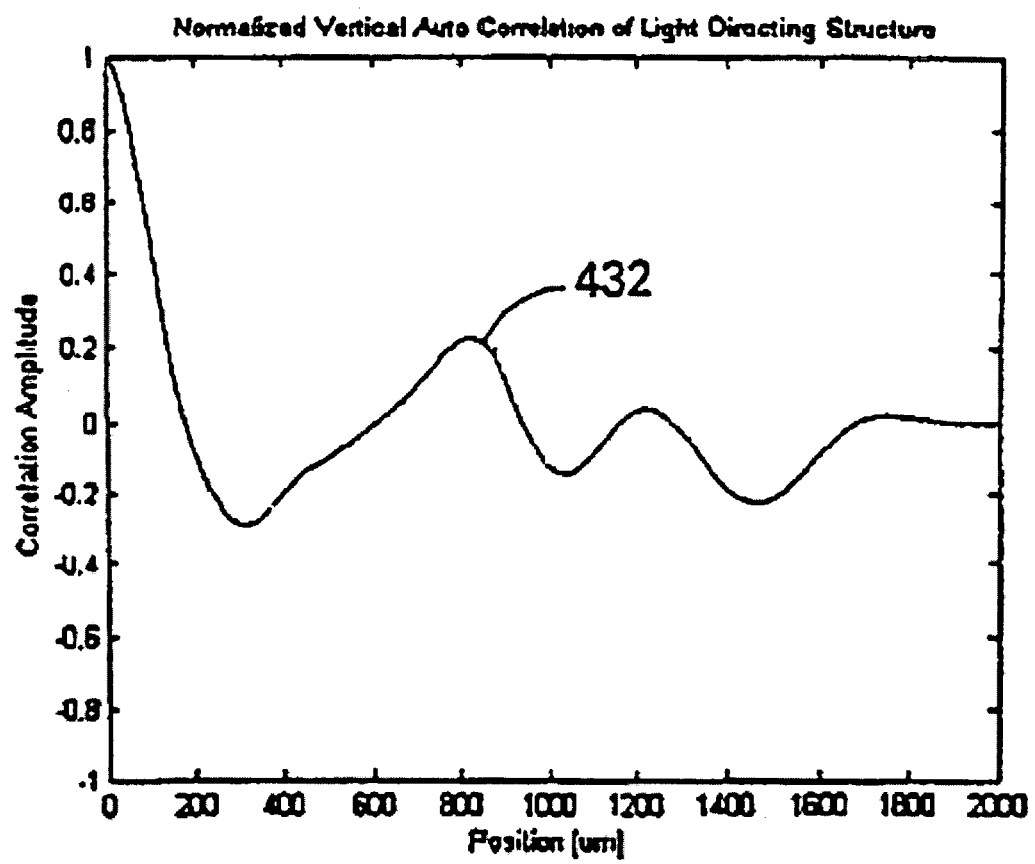
FIG. 34 is the vertical auto correlation of the height map of the 40 um pitch prism array of FIG. 22.
Figure 35:
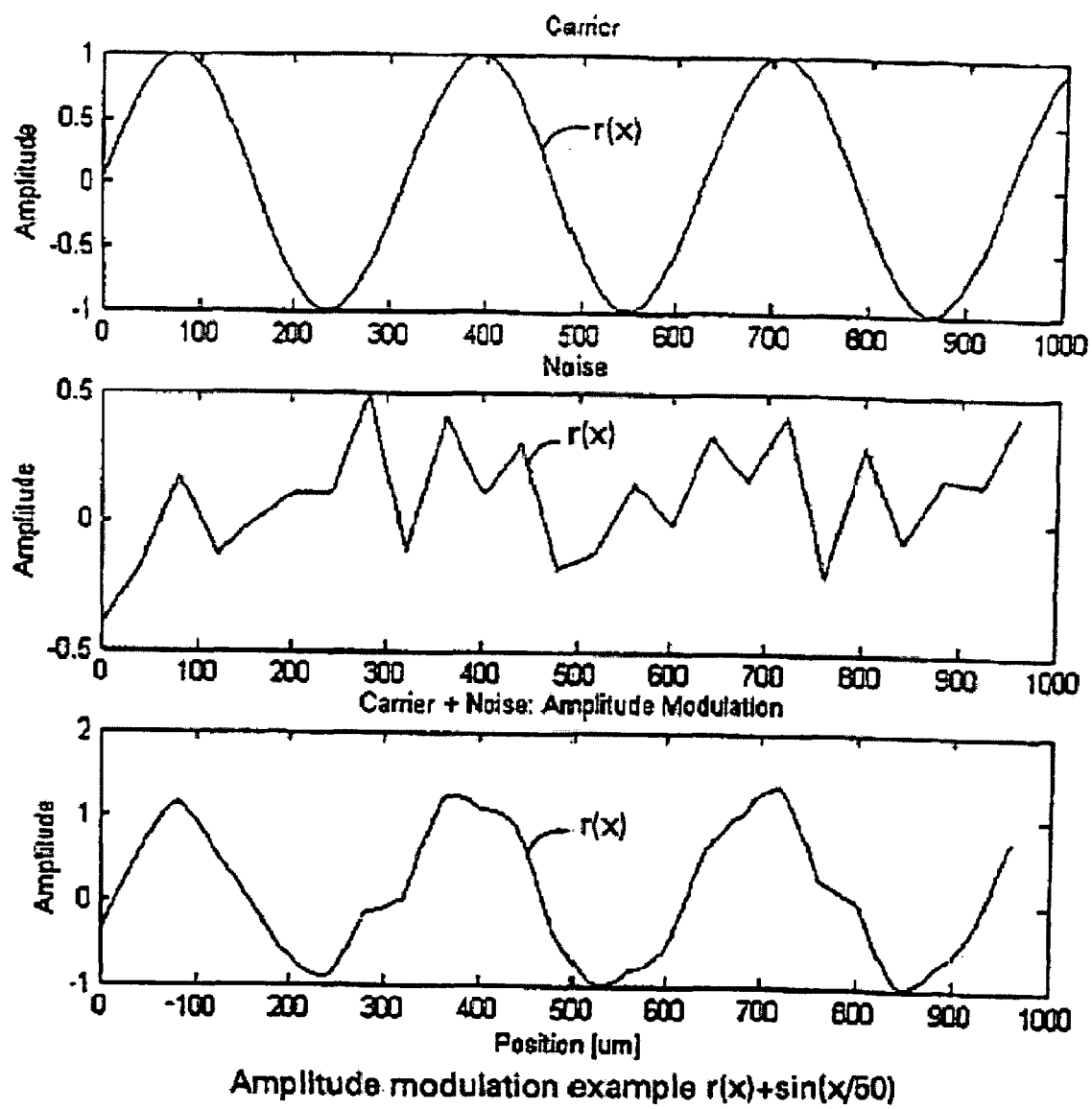
FIG. 35 is a graphical representation of a carrier wave, c(x) modulated in amplitude by a random function.
Figure 36:
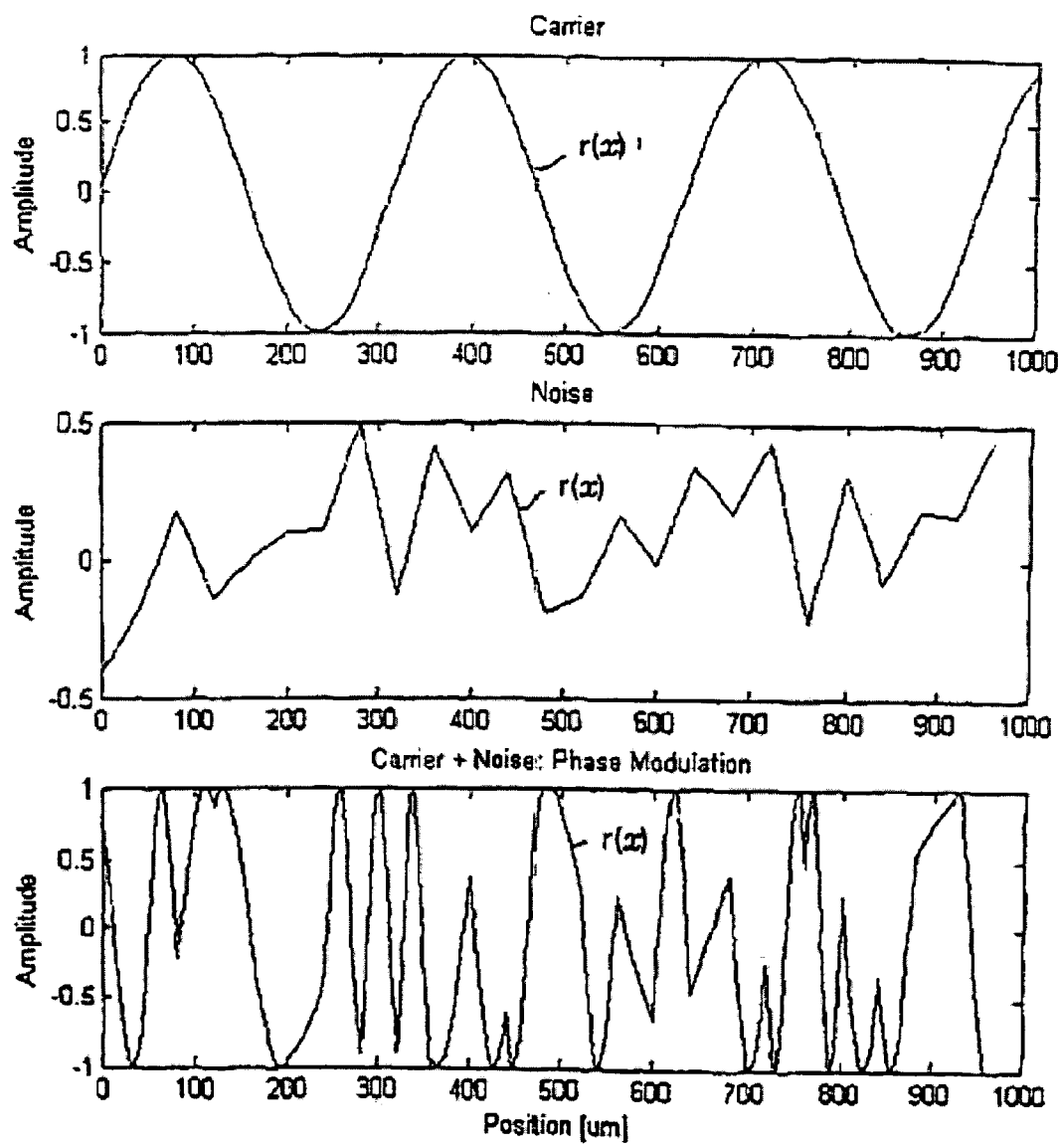
FIG. 36 is a graphical representation of a carrier wave, c(x) modulated in phase by a random function.
Figure 37:
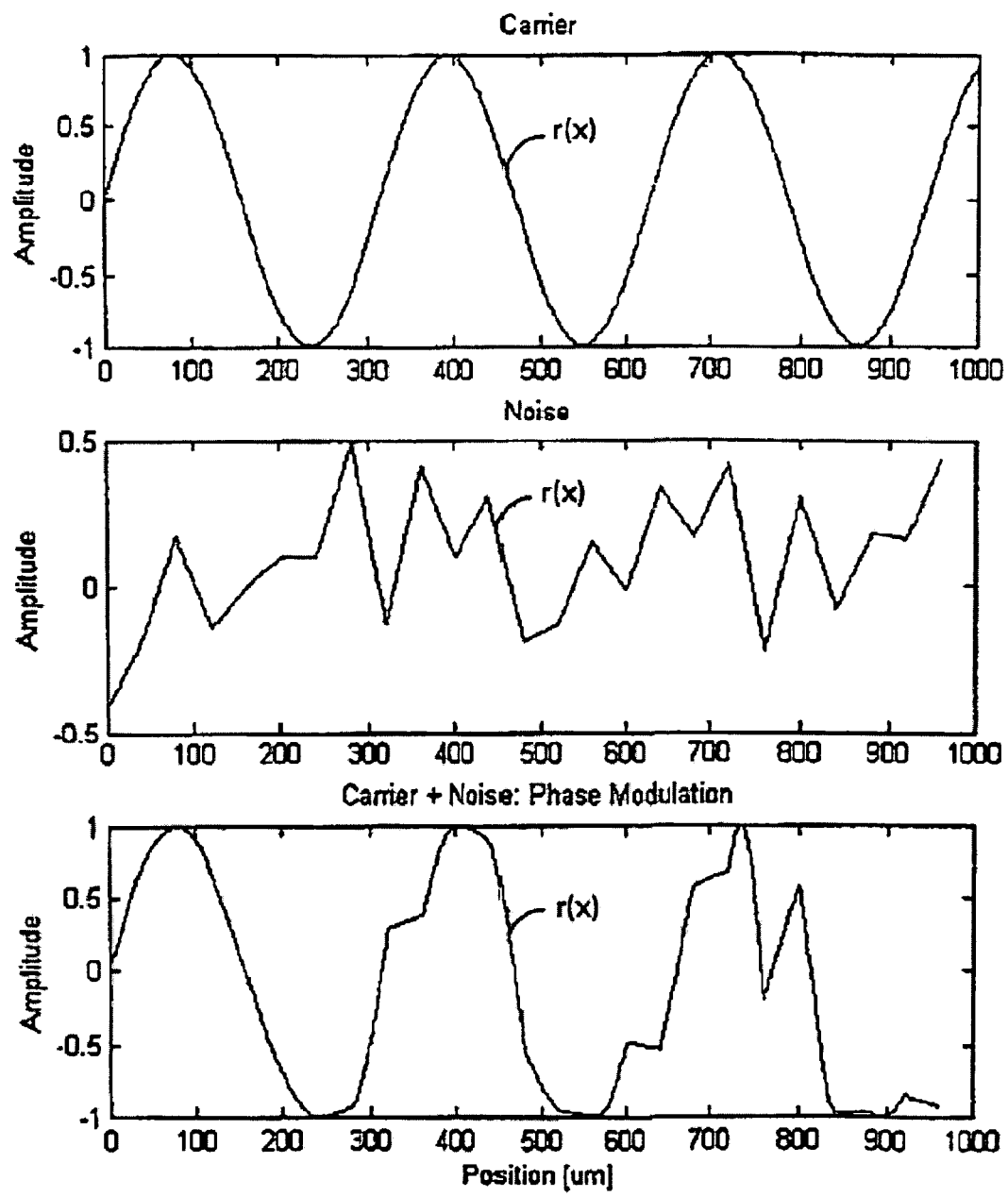
FIG. 37 is a first graphical representation of a carrier wave, c(x) modulated in frequency by a random function.
Figure 38:
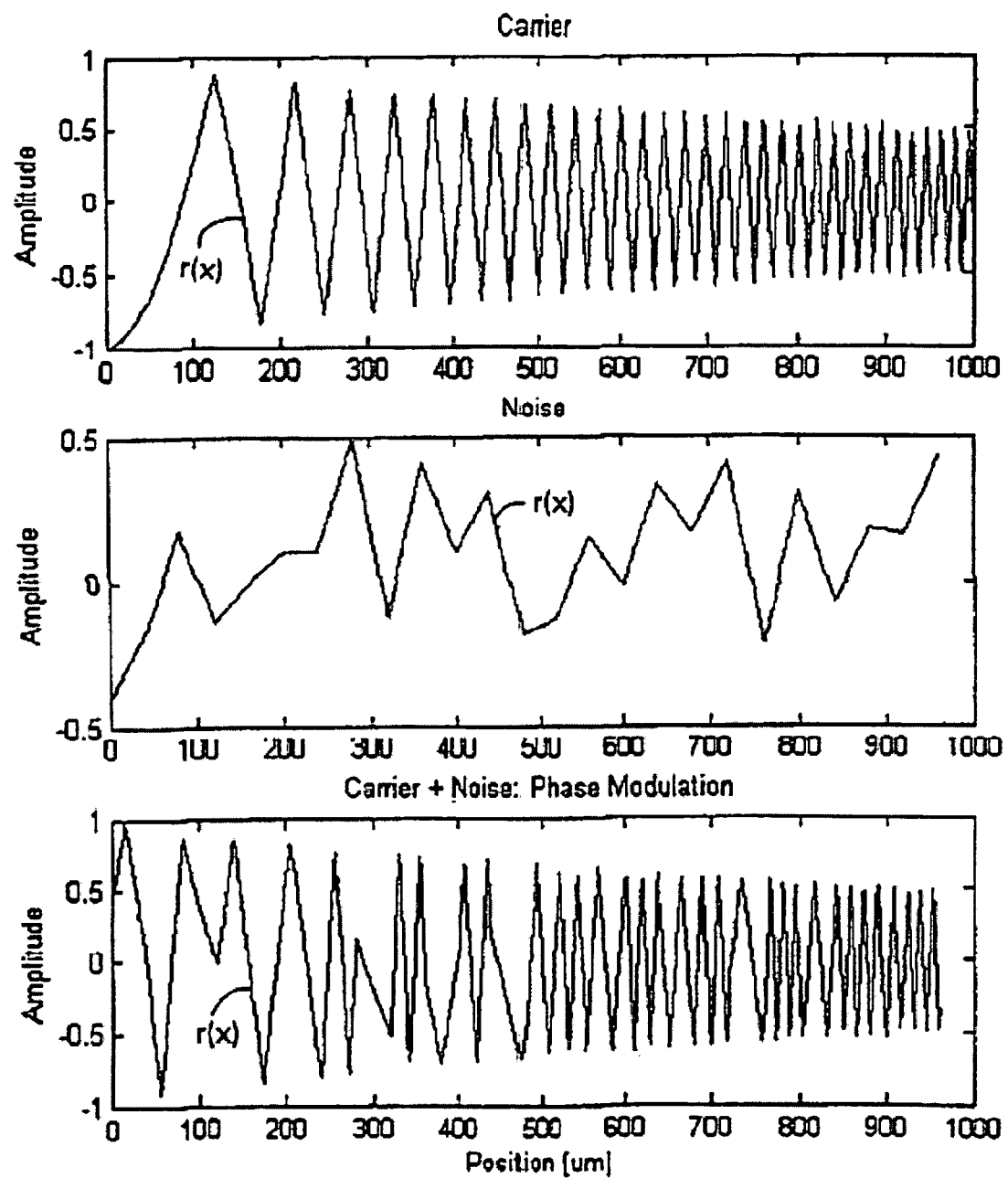
FIG. 38 is a second graphical representation of a carrier wave, c(x) modulated in frequency by a random function.

In FIG. 33 the vertical (l direction) auto correlation 430 of FIG. 26 is shown. Here it is seen that the roll-off is much less than that of FIG. 27, due to the longer period of the modulation in the vertical direction. In this example the vertical modulation is set so that the period of the oscillations is between 300 um and 500 um. For the Prism Array of FIG. 22, the vertical modulation is set so that the period of the oscillations (run lengths) are between 10 um and 100 um. In this case the attenuation is faster than that of FIG. 31 (see 432 in FIG. 34).

The generation of a model for the surface of exemplary substrates will now be described in detail. It should be noted that a number of methods for the generation of a surface model can be used and that the following discussion is but one of these methods.

By way of example, the surface depicted in FIG. 2 can be generated using an iterative process of superimposition of randomly, or psuedo-randomly, modulated waveforms. In FIG. 2, a series of superimposed waveforms generally form the three-dimensional surface of the film. These "waveforms" in the resultant structure of FIG. 2 are not necessarily present as distinct waveforms, however. Instead, the resultant three-dimensional surface of FIG. 2 contains superimposed waveforms that cross over each other and/or combine into a single waveform at certain locations.

Figure 8:
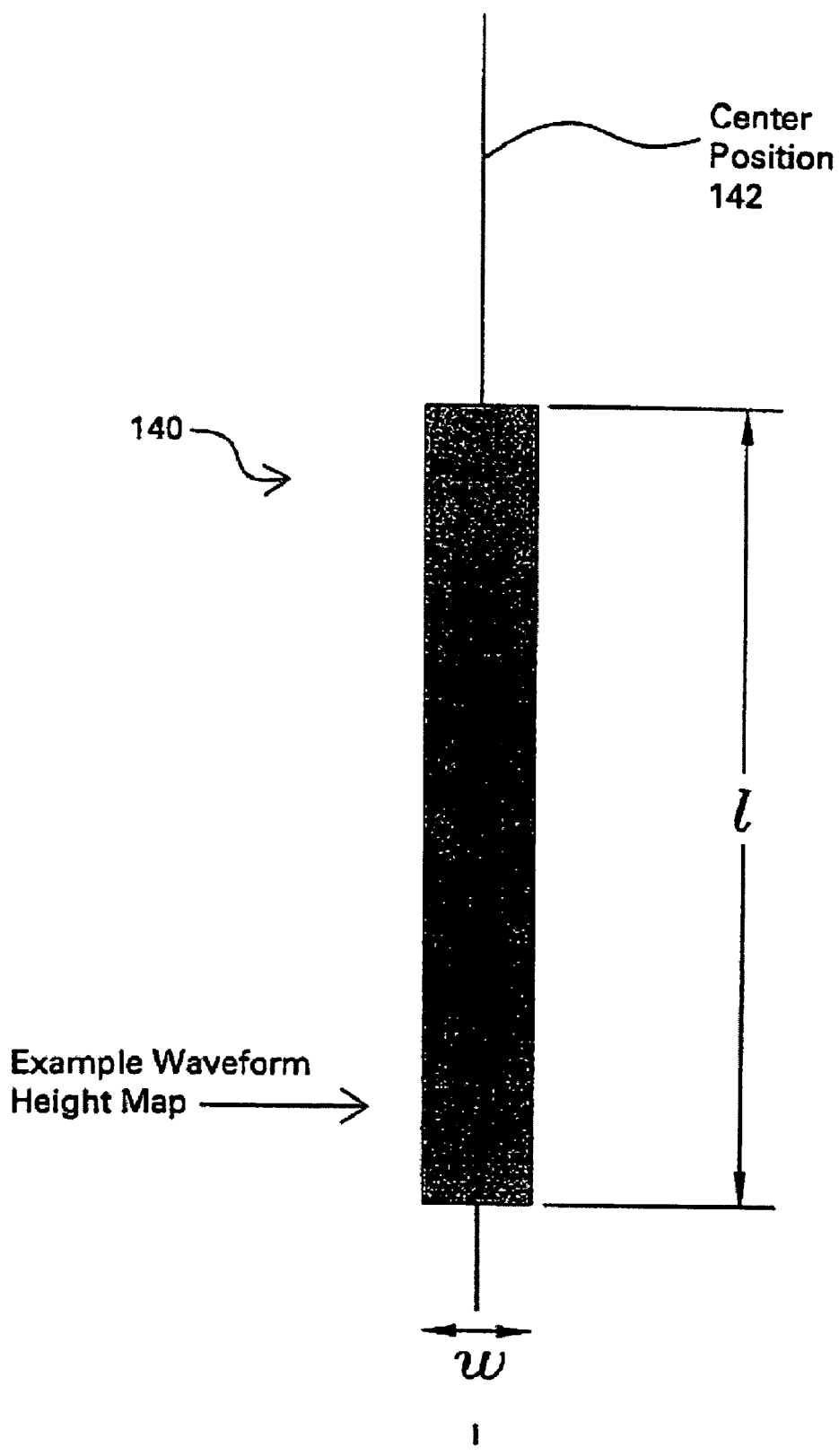
FIG. 8 is a top view of a single waveform that can be used to model an optical substrate according to one embodiment the invention.
Figure 9:
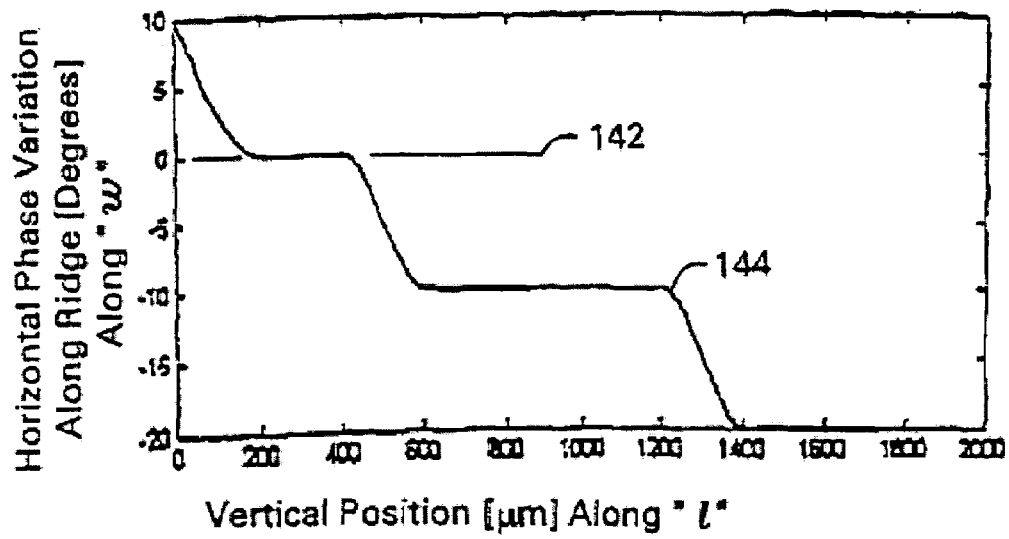
FIG. 9 is a plot showing the variation in phase along the length of the waveform depicted in FIG. 8.

To begin the iterative process that generates a substrate 40, such as that shown in FIG. 2, a series of waveforms is defined. Each of the defined waveforms has the general cross sectional shape of a sawtooth with a height of about 20 micron (um) above a reference plane. This series of waveforms is the first surface structure function referred to above. Each waveform has geometrical properties to turn light. Each of the waveforms is modulated, as described earlier, in one or more of frequency, phase, peak angle (or height). For example, FIG. 8 shows a single waveform 140 that extends from one end to the other along the l direction of FIG. 2. This waveform 140 has been modulated in phase so that, as viewed in FIG. 8, the horizontal position of the peak of the waveform varies between −20 and +20 microns in the w direction from a center position 142. FIG. 9 shows the variation in phase of the waveform 140 as a function of position along the direction l of FIG. 8. In the embodiment of FIGS. 8 and 9, modulation is applied to the waveform in random intervals between about 300 and 500 microns along the length, l, of the waveform so that the phase of the peak changes every 300 to 500 microns as l varies.

Figure 10:
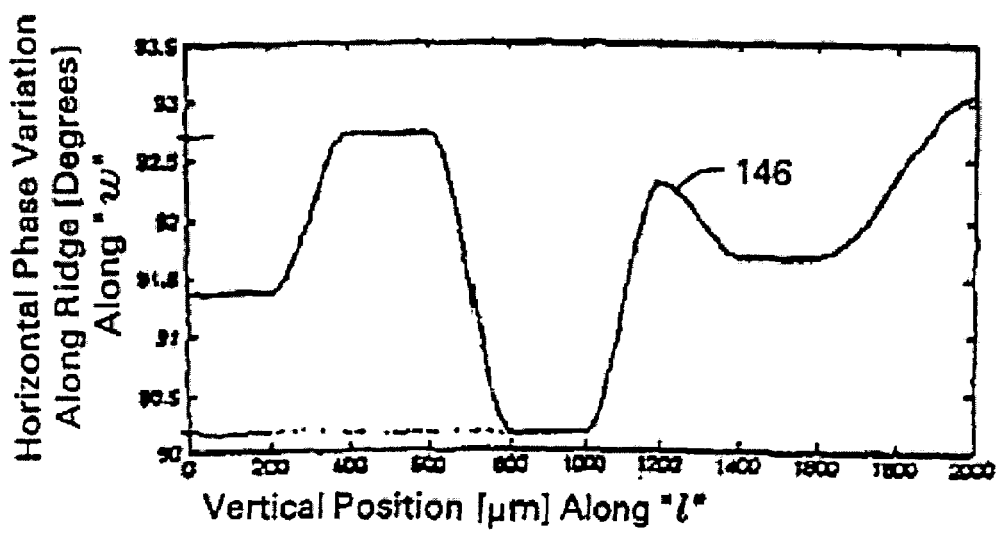
FIG. 10 is a plot showing the variation in peak angle along the length of the waveform depicted in FIG. 8.

The peak angle is the angle formed at the peak of a waveform and is shown in FIG. 5 as numeral 58. For the waveform of FIG. 8, the peak angle has also been modulated every 300 to 500 microns along l between 90 degrees and 92.8 degrees. FIG. 10 shows the variation in the peak angle of the waveform of FIG. 8 along the length l. The height of each waveform may also be modulated randomly between 15 and 20 microns along the length l.

Although only the phase and peak angle have been randomly modulated in the waveform shown in FIG. 8, the frequency and height can also be modulated in other embodiments. For instance, in one embodiment, the height of a single waveform could be randomly modulated along the length l. In another embodiment, the frequency of a single waveform could be randomly modulated along the length l. Thus, the waveform is thin in some locations and thicker in other locations. In still other embodiments, the height of different waveforms can be modulated differently. Thus, a variety of phase, frequency, peak angle and height modulation techniques can be used within the scope of the invention to form the three-dimensional surface structure of the substrates 40, 100. The amount of modulation can also vary widely in the in the various techniques.

Figure 11:
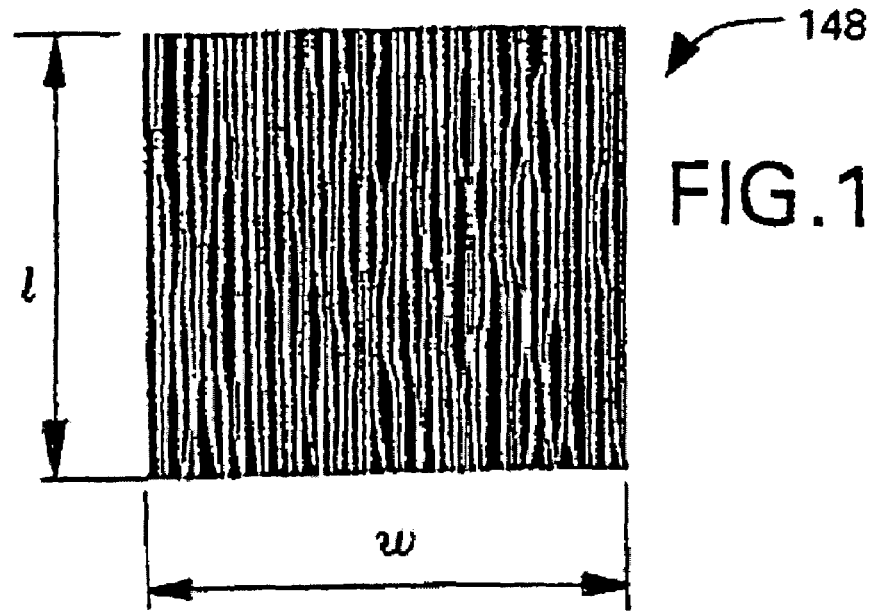
FIG. 11 is a surface structure formed after performing a first iteration of placing modulated waveform structures on a master image.

To form the structure shown in FIG. 2, a first iteration of superimposition of waveforms is performed. In the depicted embodiment, each individual waveform (modulated as described above) is stepped or placed on the surface of the substrate 40, 100 at about 40 micron intervals along the width w of the substrate 40, 100. For the 2,000 micron wide surface shown in FIG. 2, fifty waveforms would be superimposed at about 40 micron intervals. The resulting surface structure model after this first iteration would appear as shown in FIG. 11.

A second iteration of the superimposition of modulated waveforms is then performed. This second iteration can be performed in a similar manner as the first iteration. For example, another series of waveforms can be created as described above and can be superimposed at about 40 micron intervals along the width w of the substrate. The resulting surface structure model is shown in FIG. 12.

Figure 12:
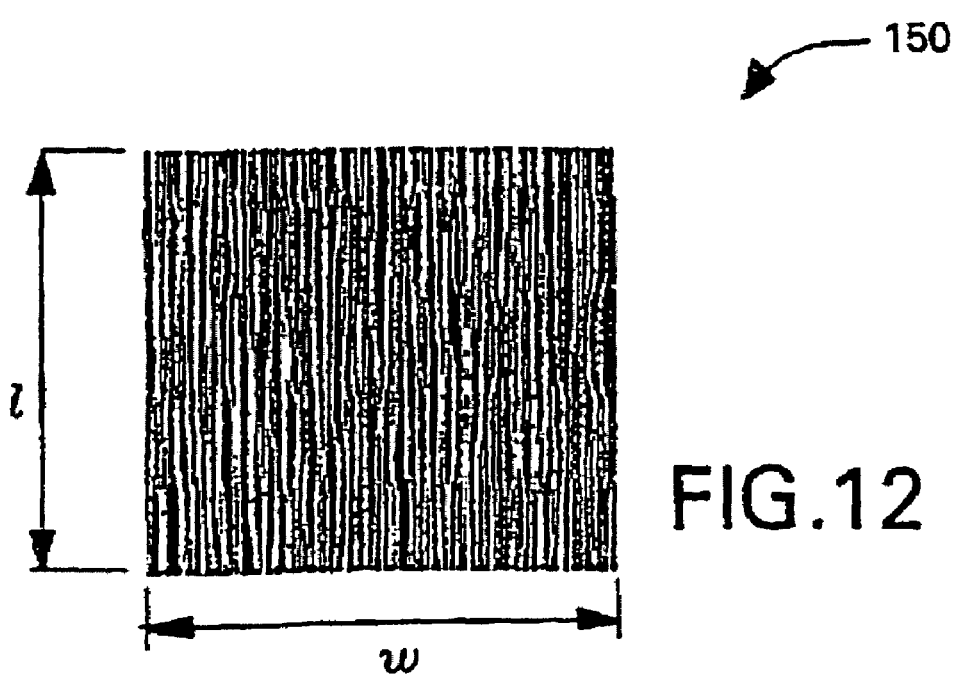
FIG. 12 is a surface structure formed after performing a second iteration of placing modulated waveform structures on the structure of FIG. 11.

Though not necessary, to form the surface structure model shown in FIG. 2 from that shown in FIG. 12, a third iteration can be performed in which a sawtooth function is superimposed. The sawtooth function may have an 8 micron height and be superimposed at 20 micron intervals along the width w of the film. This third iteration, which makes up a small portion of the resultant surface height map, can be used primarily to fill flat spots on the surface. The resulting three-dimensional surface has a random or pseudo-random structure in which the individual waveforms have been superimposed to form the surface. Due to the iterated method of superposition and the large height of the random phase modulating function the surface does not contain individual optical elements. Instead, the resultant surface is an integrated optical substrate that is formed by the convergence of multiple modulations and superimpositions by Boolean union.

Figure 14:
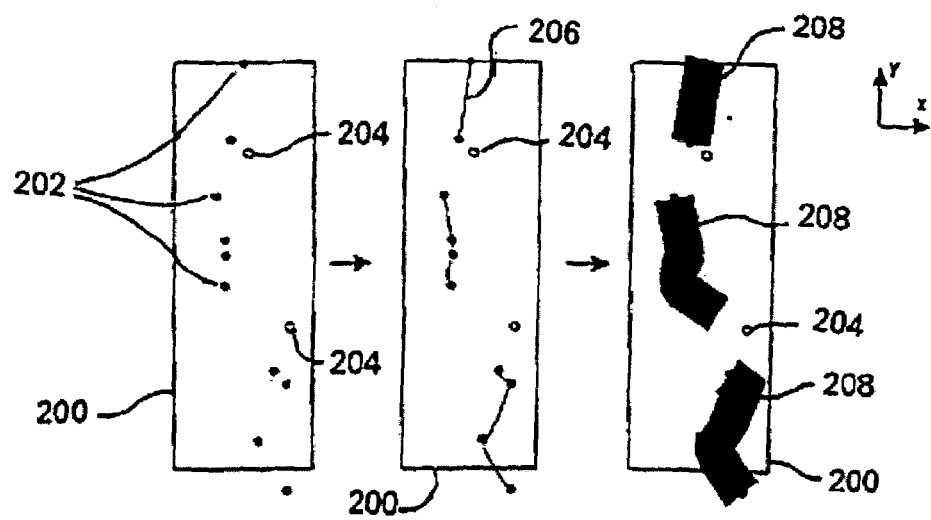
FIG. 14 is a schematic representation of control points randomly located within a window for generating a modulated waveform.
Figure 15:
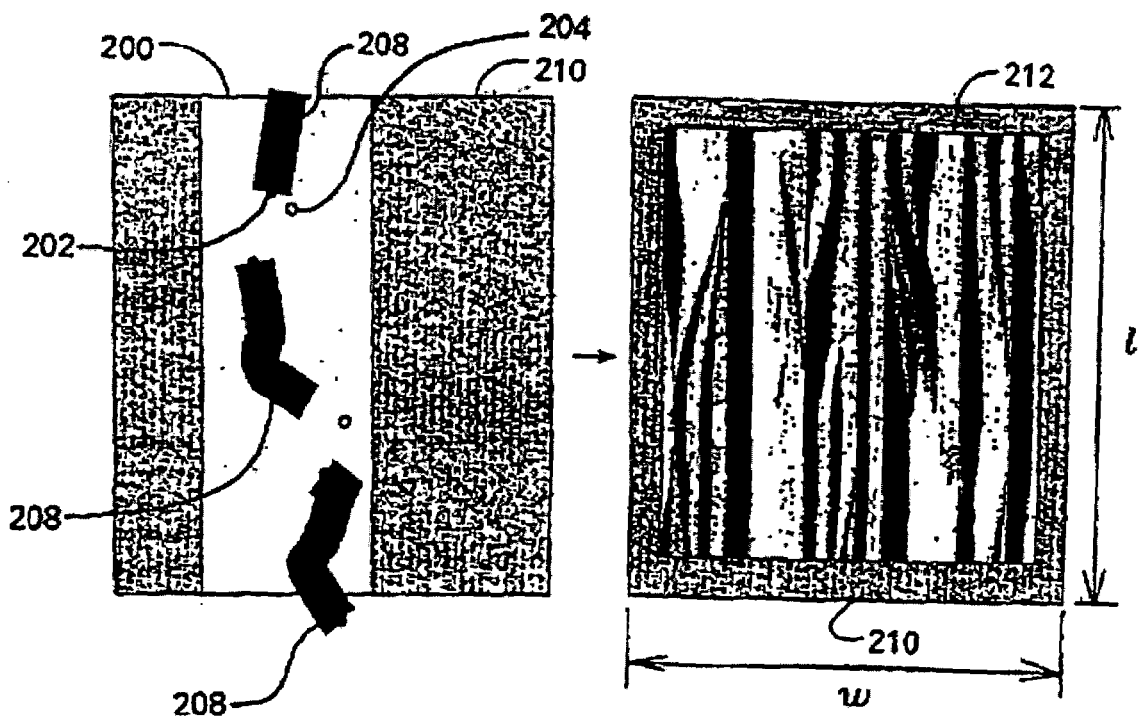
FIG. 15 is a representation of the modulated waveform of FIG. 14 applied to a master function.
Figure 16:
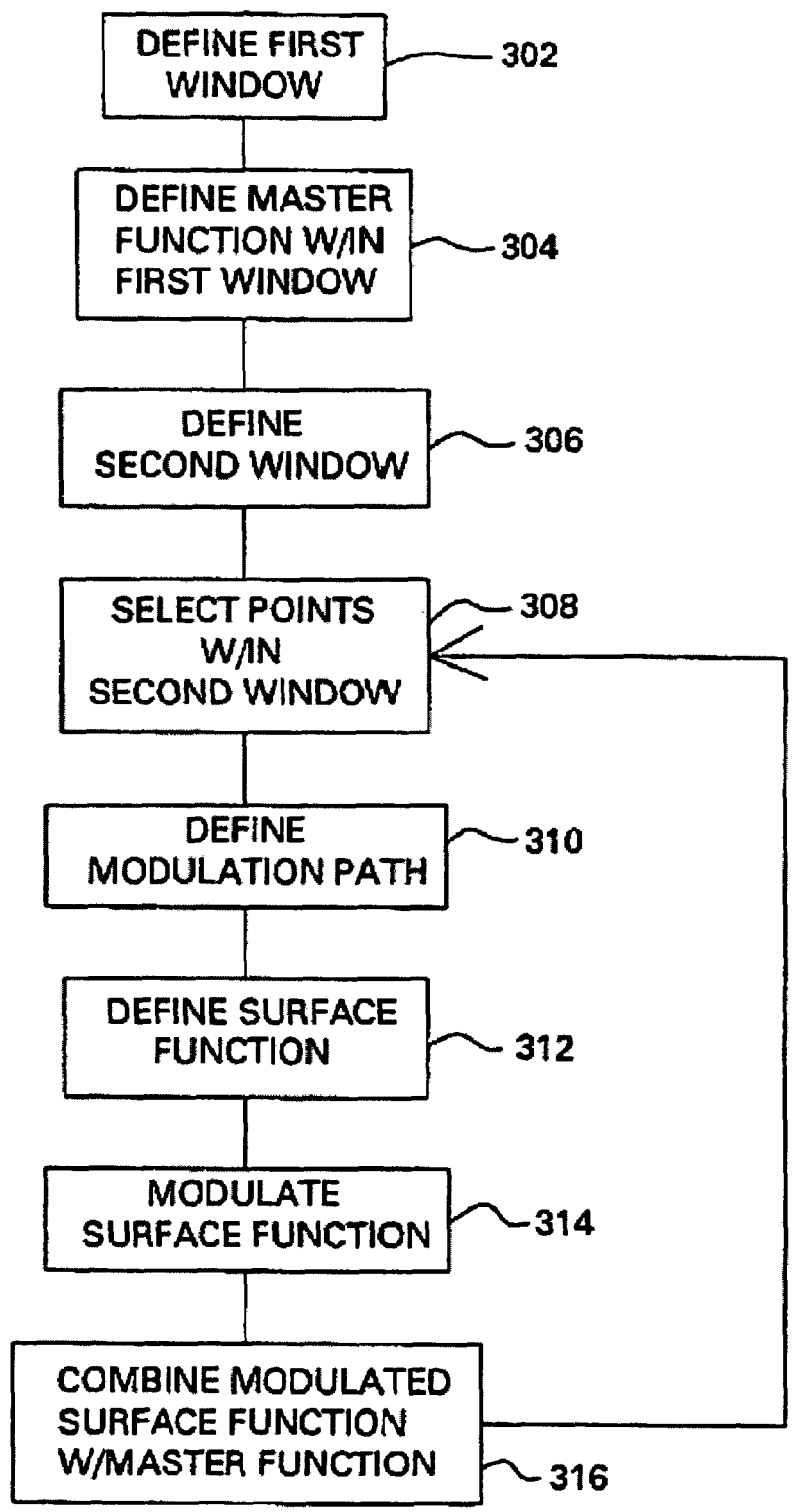
FIG. 16 is a flow chart of the method of generating a random substrate surface.
Figure 17:
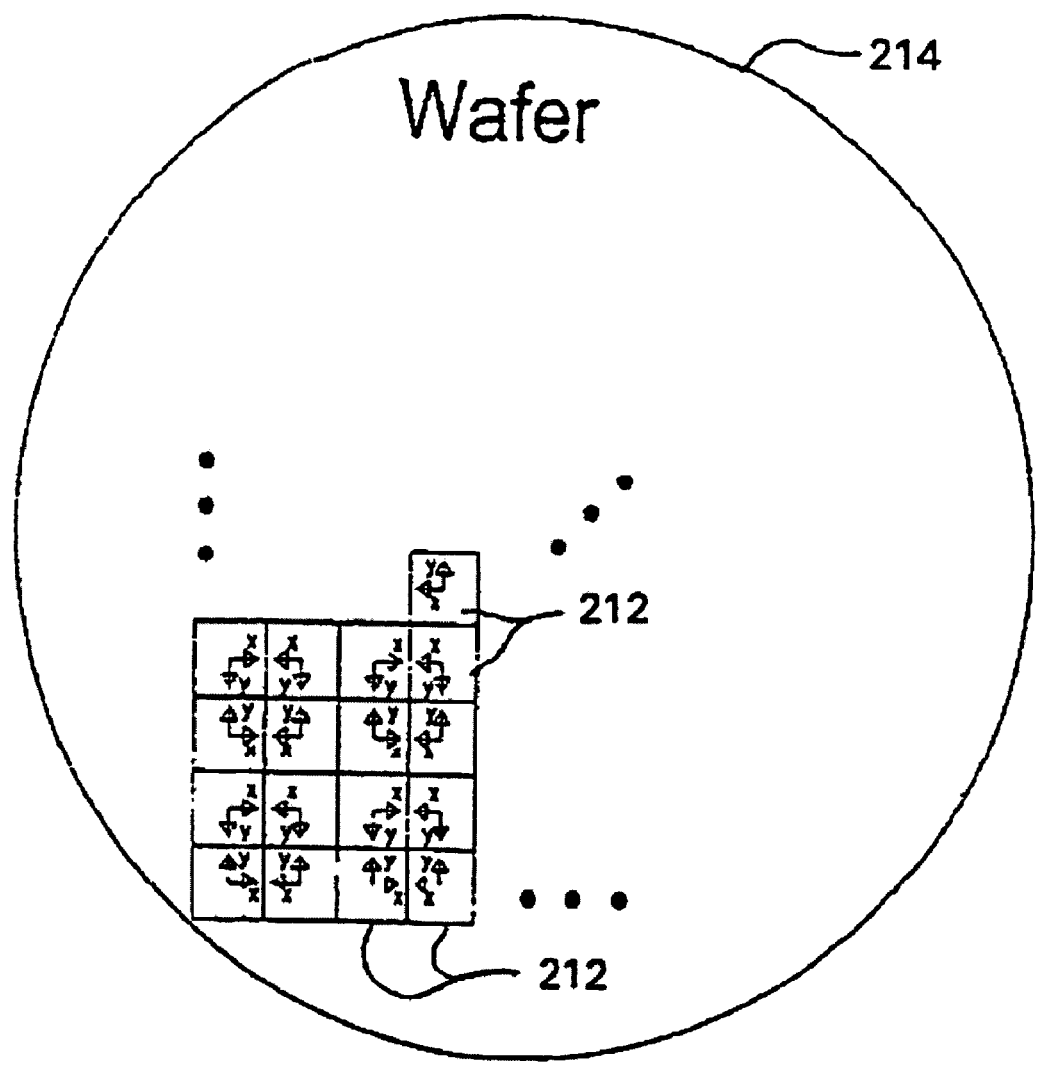
FIG. 17 is a representation of the tiling of the random substrate surface on a wafer.

Referring to FIGS. 14, 15 and 16, the method by which the substrate is randomized will now be explained. A first window 216 is defined in a coordinate system. Locations of control points 202, 204 are randomized to form a modulation path 206 in a second window 200. The second window 200 is wider than the cross section of a surface function 208, e.g., three times the width of the surface function 208. The surface function may be for example a sawtooth function or a triangular function. Starting with a first control point 202 at the top of the second window 200, at each control point location the following elements are randomized: the x position of the control point within a predetermined range such as +/−20 um; the y distance to the next control point within a predetermined range such as from 300 um to 500 um; the height of the surface function, e.g., either 0 um or 20 um.

The randomized control point locations 202, 204 are quantized to a predetermined interval such as 20 um in order to reduce diffraction effects. New control points are randomly added to the second window 200 along the modulation path 206 until the length of the second window 200 in the y (or l) direction is exceeded. However, the first control point 202, 204 falling outside of the second window 200 is retained.

The modulation path 206 is determined from the control points 202, 204 for example by using a combination of nearest neighbor or linear or cubic interpolation. Discontinuities along the modulation path 206 are introduced between any two consecutive control points 202 having a nonzero height when a control point 204 having zero height lies between the two consecutive control points 202 having a nonzero height.

A nonzero surface function 208 is generated along the modulation path between successive control points 202 having a nonzero height. The surface function 208 assumes a value of zero between control points 202 having a nonzero height when a control point 204 having zero height lies between the two consecutive control points 202 having a nonzero height. The surface function 208 may have for example a cross sectional profile of a saw tooth function.

Figure 13:
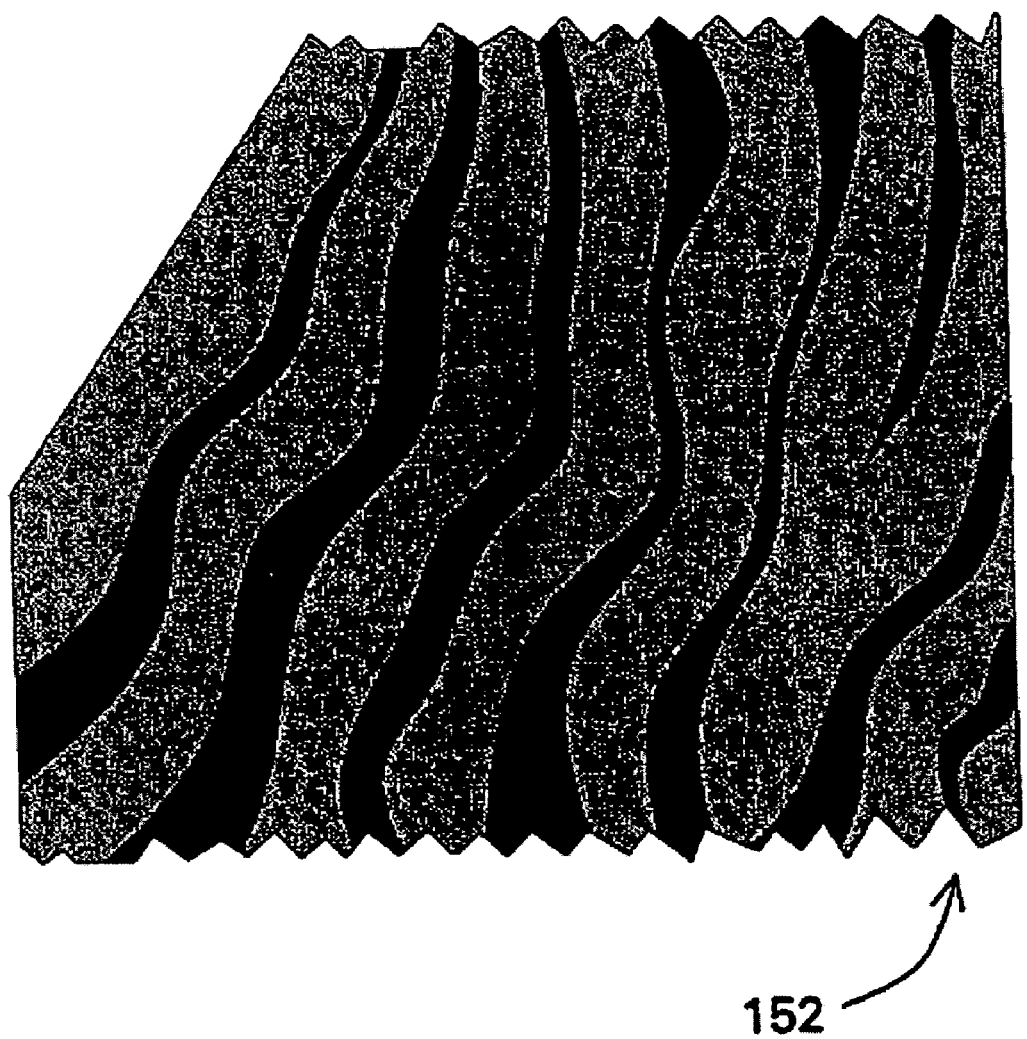
FIG. 13 is a representation of a randomized substrate surface.

The window 200, containing the randomized surface function 208 is aligned and overlayed at a first position with a master function 210, which is initially zero. A Boolean union operation is performed between the surface function 208 within the window 200 and the master function 210. This results in the surface function 208 on the master function 210. The window 200 is moved left to right along the master function 210 in a predetermined incremental step of for example 40 um. A new surface function 208 is now randomly generated within the window 200 in the manner described above and a Boolean union operation is performed between the new surface function 208 and the master function 210. The window is again moved the predetermined incremental step, a yet newer surface function 208 is again randomly generated within the window in the manner described above and yet a new Boolean union operation is performed between the newer first function 208 and the master function 210. This randomization, Boolean union and stepping process is repeated over the entire width of the master function 210. At the end of the master function 210, the window returns to the first position and the randomization, Boolean union and stepping process is repeated any number of times over the entire width of the master function 210 resulting the randomized substrate 152 of FIG. 13.

The surface function is a triangle with a width of approximately 40 um and a height of between 1 um and 200 um or more particularly a width of approximately 40 um and a height of approximately 18 um. The surface function may also be a triangle with a base to height ratio of between 40 to 1 and 1 to 10 or more particularly with a base to height ratio approximately 40 to 18.

Figure 40:
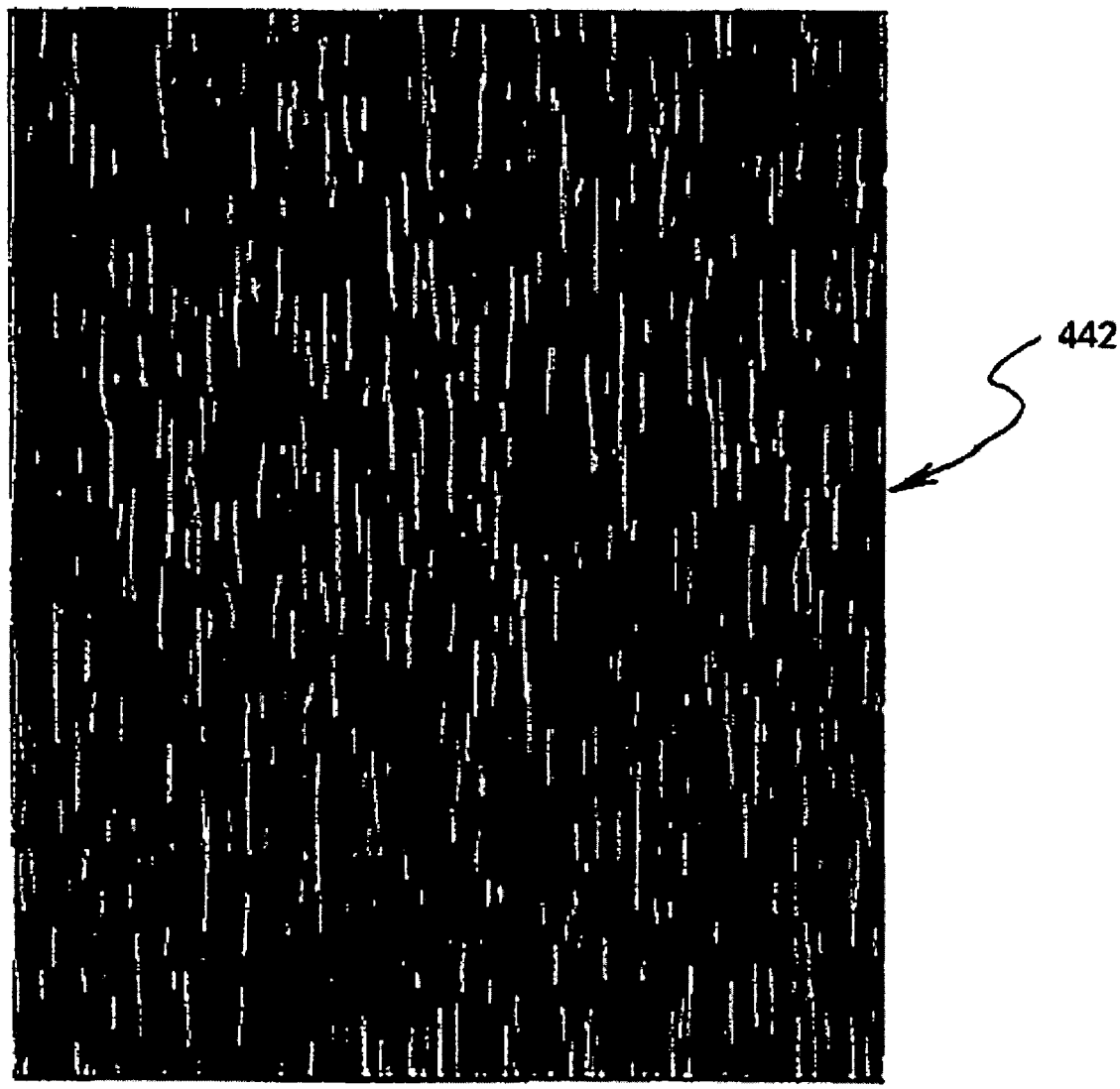
FIG. 40 is an image of a skeleton mask function.

Holes or areas of zero height in the randomized substrate are found using morphologic operators and a "skeleton mask" function is created (FIG. 40). This function is convolved with the surface function 208 and the result is combined by Boolean union with the master function 210. These sights or areas can also be use to create a sparse pattern of anti-wet-out (or Newton's rings) bumps or protrusions that have a height that is greater than the rest of the pattern. These bumps do not need to have the same form or function as the bulk of the surface. The final pattern 212 is taken by trimming away at least the outer 100 um from the master function 210. In FIG. 22, multiple copies of the final pattern 212 are then placed side-by-side to one another, or "tiled", so as to create a substrate surface as a two dimensional array on a wafer 214 mirrored with respect to one another for first order continuity. The size of the tiles, i.e., the master, is larger than the correlation length of the resultant pattern.

Thus, in FIG. 16, a window is defined at 302 and points are randomly selected within the window 304 thereby creating a modulation path 306 connecting the randomly selected points. Heights are randomly assigned at 308 to the randomly selected points within the window. A master function is defined at 314 and a surface function is generated along the modulation path at 310 and repeatedly combined with a master function 312 at successive locations within the master function.

Figure 39:
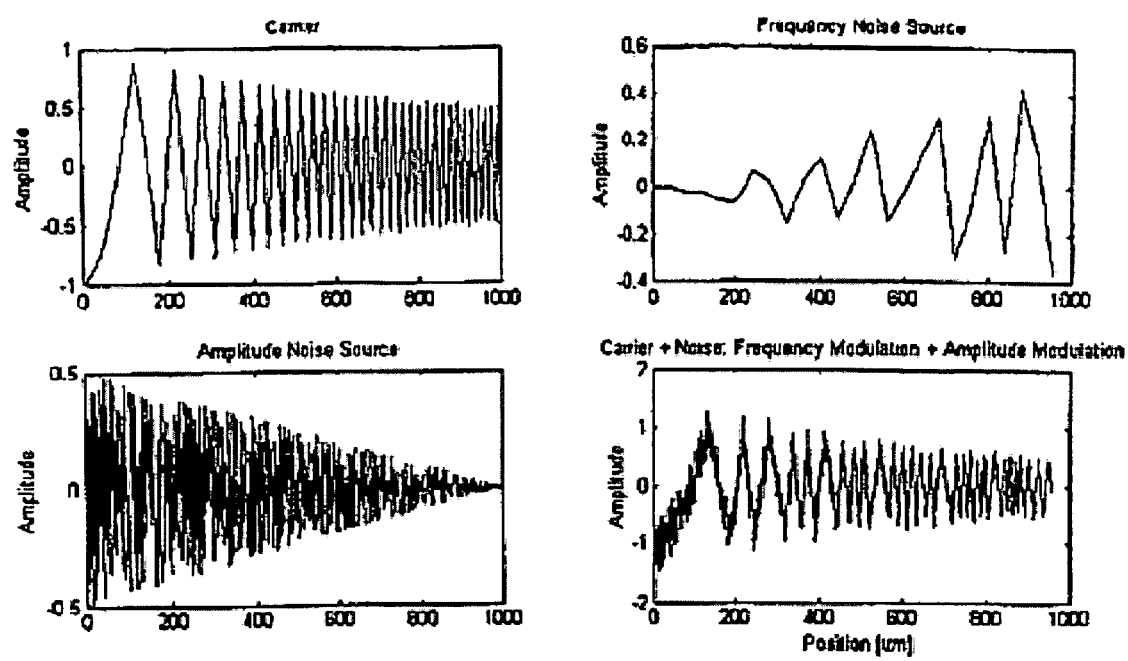
FIG. 39 is a graphical representation of frequency and amplitude modulation with spatially varying carrier and noise functions.

As best understood the surface of the substrate may not only be randomized in height, frequency, phase or peak angle, but also by refractive index. Any of these parameters may also be modulated as shown in FIGS. 35–39. Therein, a sinusoidal carrier waveform sin(x) may be modulated in amplitude, phase, or frequency by a random function r(x) yielding a randomized function R(x) according to any of the following equations:

$$R(x)=r(x)+\sin(x/k) \quad (1)$$

$$R(x)=\sin(x/k+c\times r(x)) \quad (2)$$

$$R(x)=\sin(x/(k+c\times r(x))) \quad (3)$$

$$R(x)=\text{sawtooth}(x^2/(n+10r(x)))\times(n)/(x+n) \quad (4)$$

$$R(x)=r'(x)+\text{sawtooth}(x^2/(k+m\times r(x)))\times(n)/(x+n) \quad (5)$$

where r'(x) is a second random function (or third surface function) and c, k and n are constants. The sawtooth function generates a sawtooth wave as a function of time, t, or space, w, l, having a period of 2π. The sawtooth creates a wave similar to sin(t, w, l) having peaks of −1 and 1. The sawtooth wave is defined to be −1 at multiples of 2π and to increase linearly with time with a slope of 1/π at all other times. Generally a plurality of random functions may be used to modulate a plurality of parameters of the first surface function. The plurality of random functions, r(x), as seen in FIG. 39 may each be spatially constant or spatially varying, or any combination thereof.

The actual surface of the substrates, having characteristic dimensions of about 100 mm to 1 nm, can be generated in accordance with a number of processing techniques. These processing techniques include photolithograpy, gray-scale lithography, microlithography, electrical discharge machining and micromachining using hard tools to form molds or the like for the surface model described above.

For example, the method of making the substrates may be by mastering, electroforming and mold forming. Photolithographic Mastering may be used to direct laser write to a photoresist, a gray scale mask or a series of halftone masks that may be tiled. The photoresist may be directly removed by the laser photons or used as a precursor to an additional process step, such as reactive ion etching (RIE). Alternatively the geometry might be mastered using hard tools, such as a single point diamond tool on a five axis mill. The master will generally be made as a negative. The Substrate of the master may be glass, including fused silica, crystalline, metal or plastic (polycarbonate for example). The master may be used to mold plastic parts directly or used in electroforming.

Electroforming is in one or two stages. The master will be a positive if only one stage is used. The master may be coated with a thin metal coating (especially if the master is not conductive to begin with). A "father" electroform is created by electro-depositing nickel on the master. This replica is again electroformed to create a "daughter" that is used to mold the plastic parts.

The object that is used to mold the device (films) is referred to as the mold. The mold may be in the form or a belt, a drum, a plate, or a cavity. The mold may be tiles from a plurality of masters or electro forms. The mold may be used to form the structures on a substrate through hot embossing of the substrate, cold calendaring of the substrate or through the addition of an ultraviolet curing or thermal setting material in which the structures are formed. The mold may be used to form the film through injection molding or vacuum forming. The substrate or coating material may be any organic, inorganic or hybrid optically transparent material and may include suspended diffusion, birefringent or index of refraction modifying particles.

The optical substrate so formed may be formed with an optically transparent material with an index of refraction between of 1.1 and 3.0 and more particularly with an index of refraction of approximately 1.75.

Figure 41:
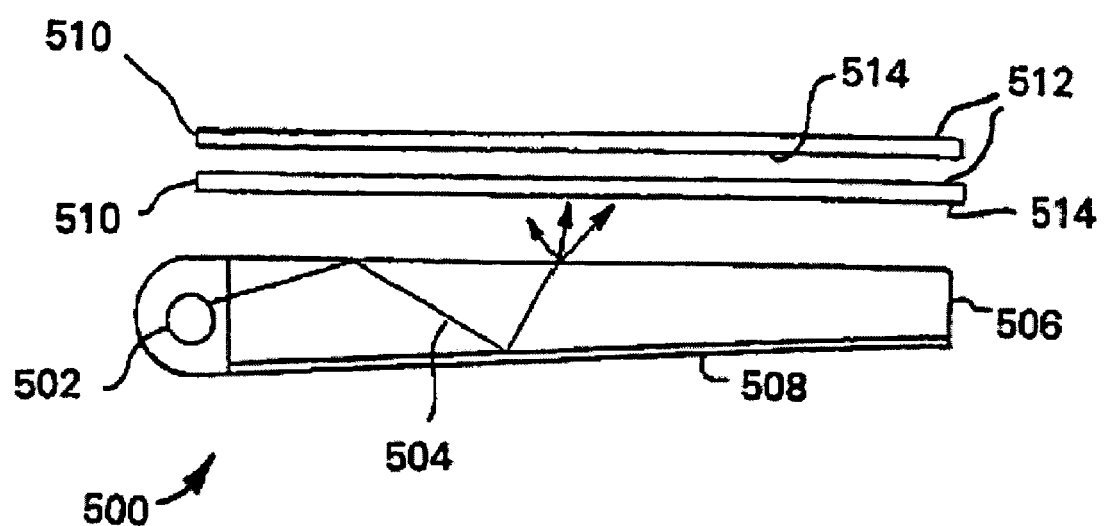
FIG. 41 is a sectional view of a backlight display device.

In FIG. 41 a sectional view of a backlight display 500 device is shown. The backlight display device 500 comprises an optical source 502 for generating light 504. A light guide 506 guides the light 504 therealong. A reflective surface 508 reflects the light 504 out of the light guide 506. At least one optical substrate 510 is receptive of the light 504 from the reflective surface 510. The optical substrates 510 comprise a three-dimensional surface 512 defined by two surface structure functions, the first surface structure function has a length, width and peak angle with optical characteristics to produce at least one output specular component from an input beam of light. The second surface structure function has a geometry with at least pseudo-random characteristics to modulate the first surface structure function in one or more of frequency, phase and peak angle along the length of the first surface structure function. The three-dimensional surface 512 has a correlation function value of less than about 37 percent of an initial in a correlation length of about 1 cm or less. In the backlight display device 500, one of the optical substrates 510 may include a first three-dimensional surface 512 and a second three-dimensional surface 514 opposing the first three-dimensional surface 512. The second three-dimensional surface 514 may also have a correlation function value of less than about 37 percent of an initial in a correlation length of about 1 cm or less. The second three-dimensional surface has two surface structure functions; a third surface structure function having a length, width and peak angle with optical characteristics to produce at least one output specular component from an input beam of light and a fourth surface structure function having a geometry with at least pseudo-random characteristics to modulate the first surface structure function in one or more of frequency, phase and peak angle along the length of the first surface structure function.

In the backlight display device 500 the optical substrates 510 include first and second surface functions in a relative orientation from zero to ninety degrees with respect to one another, which may be parallel or perpendicular with respect to one another.

Aside from the use of the optical substrates described above in backlight displays for brightness enhancement, the substrates can be used in a wide variety of other applications as well. Embodiments of the substrates can be used in Fresnel lenses, holographic substrates or in combination with conventional lenses, prisms or mirrors. Such embodiments could be formed by modulating concentric circles or ellipses having fixed characteristics. The optical substrates can also be used in single or multi-order reflective, transmissive or partially transmissive, whether light absorbing or non light absorbing prisms, holographic optical elements, or diffraction gratings, and the output angles of the specular components can be tuned by changing the first surface structure function. The substrates can be used in other applications such as projection displays, illuminated signs, and traffic signals.

The above describes a number of examples of an optical substrate or film with a three-dimensional surface defined by a first surface structure function and a second surface structure function, where the first surface structure function has a geometry with optical characteristics to produce at least one output specular component from an input beam of light. In these examples, the second surface structure function has a geometry with at least pseudo-random characteristics to modulate the first surface structure function such that the surface of the optical substrate produces specular and diffuse light from the input beam of light. The first surface structure function may be defined in a number of ways, depending upon the desired application.

Moreover, the second surface structure function may modulate the first surface structure function in one direction, or in more than one direction, such as in two orthogonal directions. Modulation in two directions is shown, for example, in the description of FIG. 6.

Further, in general the random modulation may modulate any one or more of the parameters of the first surface structure. Depending on the particular first surface structure function, the parameters may include pitch, peak height, phase, peak angle, or other parameters.

A number of further examples of the first surface function are provided below for various applications where it is desired to modulate the first surface function with the second surface structure function having a geometry with at least pseudo-random characteristics, such that resulting surface produces diffuse light in addition to the specular light due to the first surface structure function. In general, the pseudo-random modulation is sufficient to provide a resultant surface that provides diffuse light when a light beam is incident thereon. In the present discussion specular is defined to mean any component of reflected or transmitted light that that is not diffused on a macroscopic scale. The macroscopic is the bulk behavior that would be observed by interrogating the surface of the substrate with a beam of coherent light with a diameter of about 500 micron or greater. A classic multi-order grating would be considered to have multiple specular components.

Figure 42:
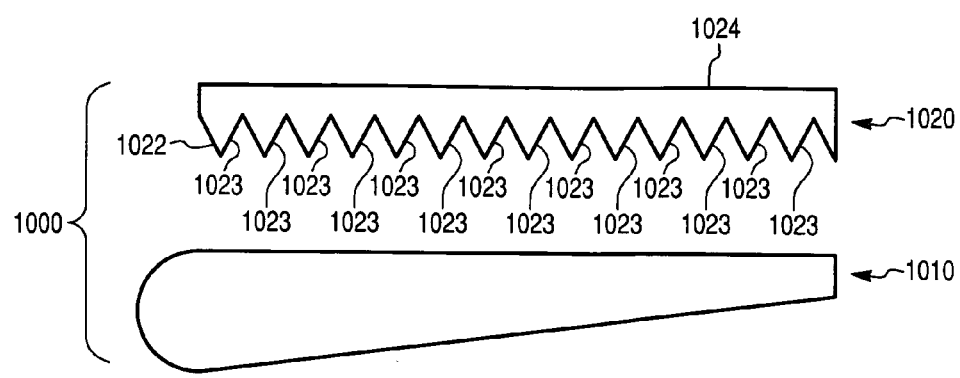
FIG. 42 is a side sectional view of a display device according to another embodiment of the invention.

The pseudo-random modulation may be applied to a light exit surface of an exit light direction modifier in a light display, for example. FIG. 42 is a schematic of a light display 1000 having a light flux paralizer 1010 that functions to provide parallel light, and an exit light direction modifier 1020 that receives light from the light flux paralizer 1010. Such a light display is shown, for example, in U.S. Pat. No. 5,982,540. The exit light direction modifier 1020 includes a light incident surface 1022 which faces towards the light flux paralizer 1010. The light incident surface 1022 receives light from the light flux paralizer 1010. The exit light direction modifier 1020 also includes a light exit surface 1024 opposite to the light incident surface 1022. The light incident surface 1022 is defined by a first surface structure function defining a plurality of prism 1023 surfaces. According to an aspect of the invention, the first surface structure function as shown in FIG. 42 as the light incident surface 1022 is modulated by the second surface structure function which provides pseudo-random modulation.

Figure 43:
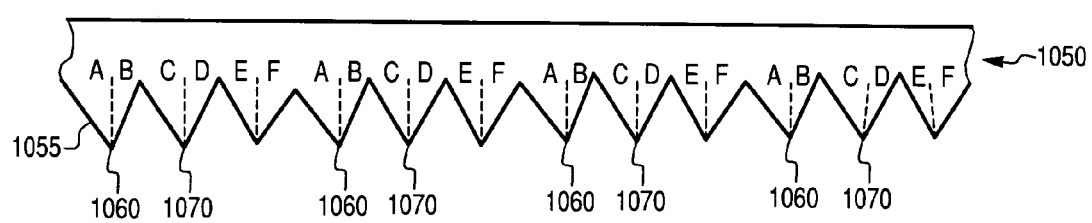
FIG. 43 is a side sectional view of an optical substrate according to another embodiment of the invention.

The pseudo-random modulation may be applied to a first surface structure function as defined by the surface shown in FIG. 43. FIG. 43 illustrates a substrate 1050 with a surface 1055 as shown. Such a substrate is described, for example, in WO 01/27527 A1. The surface 1055 in this case is the surface of a plurality of first prisms 1060 having a first prism configuration and a plurality of second prisms 1070 having a second configuration different from the first prism configuration. The first prism configuration may be the size of the side angles A and B of the first prisms 1060, and the second prism configuration may be size of the side angles D and E of the second prisms 1070, for example. As an alternative, the first prism configuration may be the orientation of the angles of the first prisms 1060, and the second prism configuration may be the orientation of the angles of the second prisms 1070. According to an aspect of the invention, the first surface structure function as described is modulated by the second surface structure function.

Figure 44:
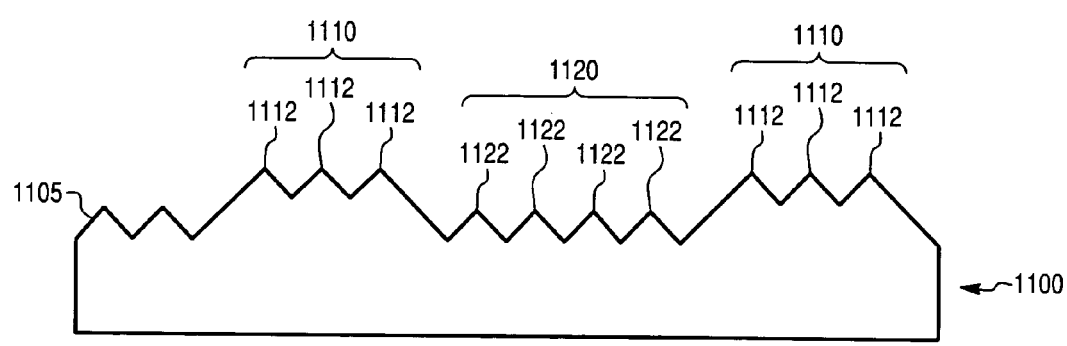
FIG. 44 is a side sectional view of an optical substrate according to another embodiment of the invention.

The pseudo-random modulation may be applied to a first surface structure function as defined by the surface shown in FIG. 44. FIG. 44 illustrates a substrate 1100 with a surface 1105 as shown. Such a substrate is described, for example, in U.S. Pat. No. 5,771,328. The surface 1105 in this case has a first region 1110 having multiple peaks 1112 with a first average peak height, and a second region 1120 having multiple peaks 1122 with a second average peak height. The second average peak height is different from the first average peak height. In the case shown in FIG. 44 the second average peak height is less than the first average peak height. According to an aspect of the invention, the first surface structure function as described is modulated by the second surface structure function.

Figure 45:
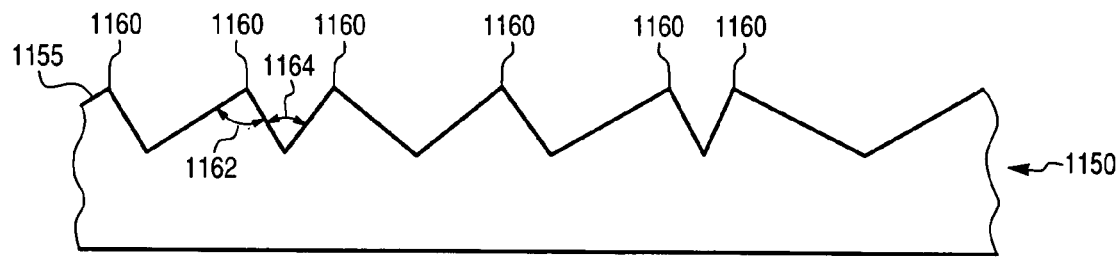
FIG. 45 is a side sectional view of an optical substrate according to another embodiment of the invention.

The pseudo-random modulation may be applied to a first surface structure function as defined by the surface shown in FIG. 45. FIG. 45 illustrates a brightness enhancement film 1150 with a surface 1155 as shown. Such a substrate is described, for example, in U.S. Pat. No. 5,917,664. The surface 1155 is a surface with pairs of side by side prisms 1160. Each pair has first and second prisms, and each prism has a prism angle 1162 and a valley angle 1164. Either said prism angle or said valley angle of each pair, but not both, are equal. According to an aspect of the invention, the first surface structure function as described is modulated by the second surface structure function.

Figure 46:
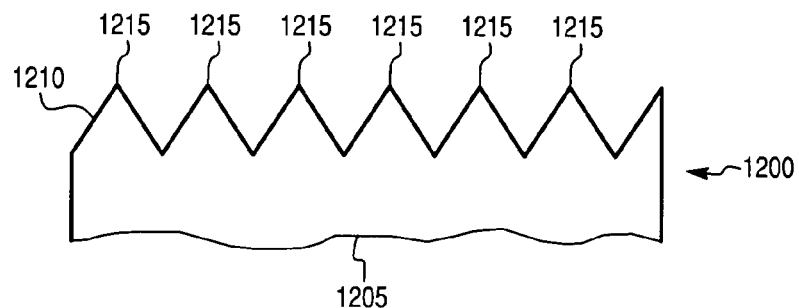
FIG. 46 is a side sectional view of an optical substrate according to another embodiment of the invention.

The pseudo-random modulation may be applied to a first surface structure function as illustrated by FIG. 46. FIG. 46 illustrates a substrate 1200 with an anti-wet-out surface 1205 and a surface 1210 with multiple prisms 1215 opposite the anti-wet-out surface 1205. Such a substrate is described, for example, in U.S. Pat. No. 6,322,236. The anti-wet-out surface 1205 may have random modulations to reduce wet out phenomena between surfaces. The first surface structure function is defined by the surface 1210 with multiple prisms 1215 opposite the anti-wet-out surface 1205. According to an aspect of the invention, the first surface structure function as described is modulated by the second surface structure function.

Figure 47:
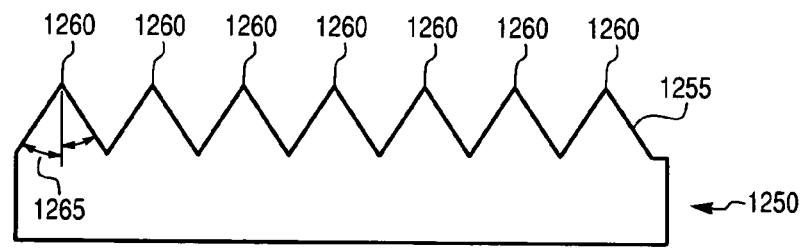
FIG. 47 is a side sectional view of an optical substrate according to another embodiment of the invention.

The pseudo-random modulation may be applied to a first surface structure function as defined by the surface shown in FIG. 47. FIG. 47 illustrates an optical substrate 1250 with a surface 1255 as shown. The surface 1255 is a surface of a plurality of prisms 1260, each of the prisms 1260 having a slope defined by a slope angle 1265. According to an aspect of the invention, the first surface structure function as described is modulated by the second surface structure function where the second surface structure function modulates the slope.

Figure 48:
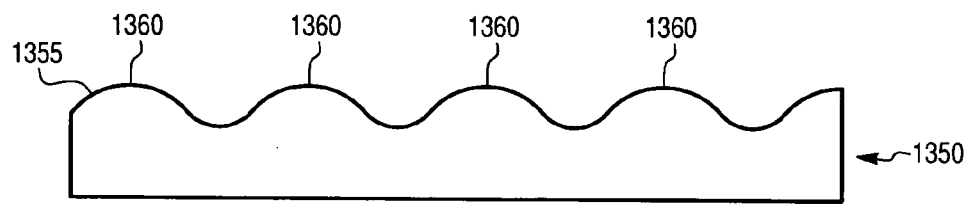
FIG. 48 is a side sectional view of an optical substrate according to another embodiment of the invention.

The pseudo-random modulation may be applied to a first surface structure function as defined by the surface shown in FIG. 48. FIG. 48 illustrates an optical substrate 1350 with a surface 1355 as shown. The surface 1355 is a surface of a lenslet array comprising an array of lenslets 1360. According to an aspect of the invention, the first surface structure function as described is modulated by the second surface structure function.

Figure 49:
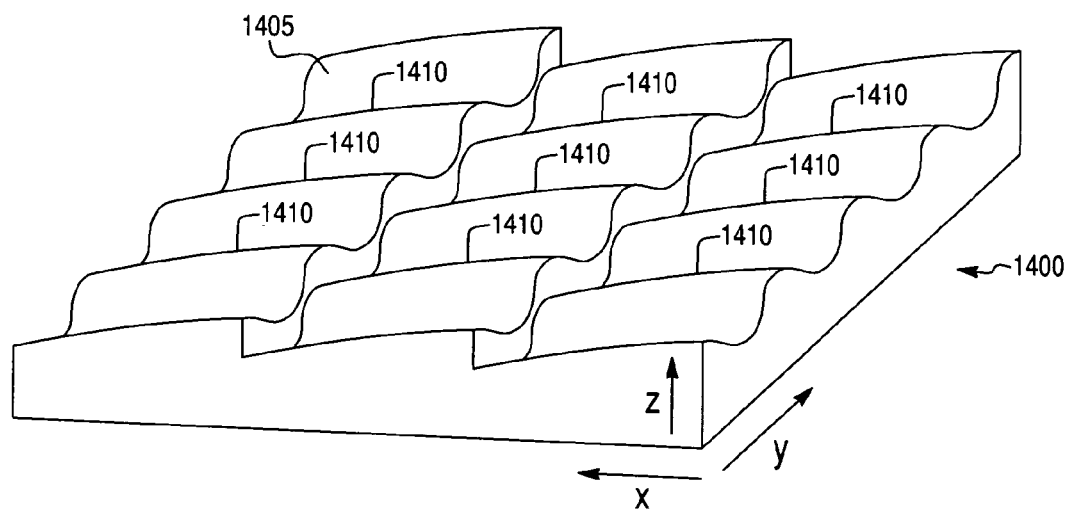
FIG. 49 is a perspective view of an optical substrate according to another embodiment of the invention.

The pseudo-random modulation may be applied to a first surface structure function as defined by the surface shown in FIG. 49. FIG. 49 illustrates a substrate 1400 with a surface 1405 as shown. Such a substrate is described, for example, in U.S. Patent application publication 2003/0035231. The surface 1405 in this case has a plurality of prism structures 1410 extending generally in a first direction (x-direction), having a spacing in a second direction (y-direction) perpendicular to the first direction between adjacent of the prismatic structures 1410. The prismatic structures 1410 have a height varying in the first direction. According to an aspect of the invention, the first surface structure function as described is modulated by the second surface structure function.

Figure 50:
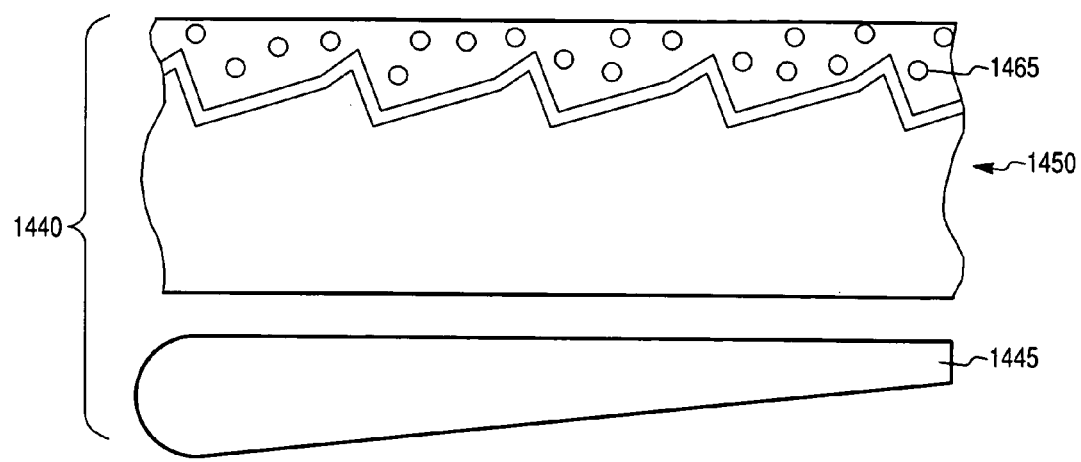
FIG. 50 is a side sectional view of a display device according to another embodiment of the invention.

The pseudo-random modulation may be applied to a first surface structure function as defined by the surface of the optical film of the display device shown schematically in FIG. 50. FIG. 50 illustrates a display device 1440 with a backlight 1445 and a film 1450 with a surface 1455 as shown. Such a film is described, for example, in U.S. Patent application publication 2003/0035231. The backlight 1445 provides light to the film 1450. The film has a plurality of beads 1465 therein to aid in diffusing light from the backlight 1445. According to an aspect of the invention, the first surface structure function as described is modulated by the second surface structure function.

The optical films and substrates described above have generally been of insulating material. The present invention also contemplates such films and substrates with a metal layer thereon.

Furthermore, the optical films and substrates described above have generally been described with a first surface structure function defining an ordered arrangement of structures, such as an ordered arrangement of prisms. As an alternative, the arrangement of the structures need not be ordered, but may instead by non-ordered.

Figure 51:
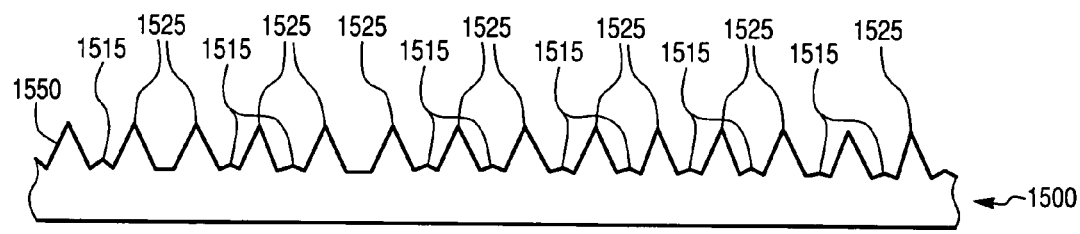
FIG. 51 is a side sectional view of an optical substrate according to another embodiment of the invention.

The pseudo-random modulation may be applied to a first surface structure function as defined by the surface shown in FIG. 51. FIG. 51 illustrates a substrate 1500 with a surface 1505 as shown. Such a substrate is described, for example, in U.S. Pat. No. 6,456,437. The surface 1505 in this case has a plurality of refraction prisms 1515 and a plurality of reflection prisms 1525. The refraction prisms 1515 only transmit light efficiently for small bending angles, whereas the reflection prisms 1525 are particularly suitable for achieving exit angles greater than 20°. According to an aspect of the invention, the first surface structure function as described is modulated by the second surface structure function.

Figure 52:
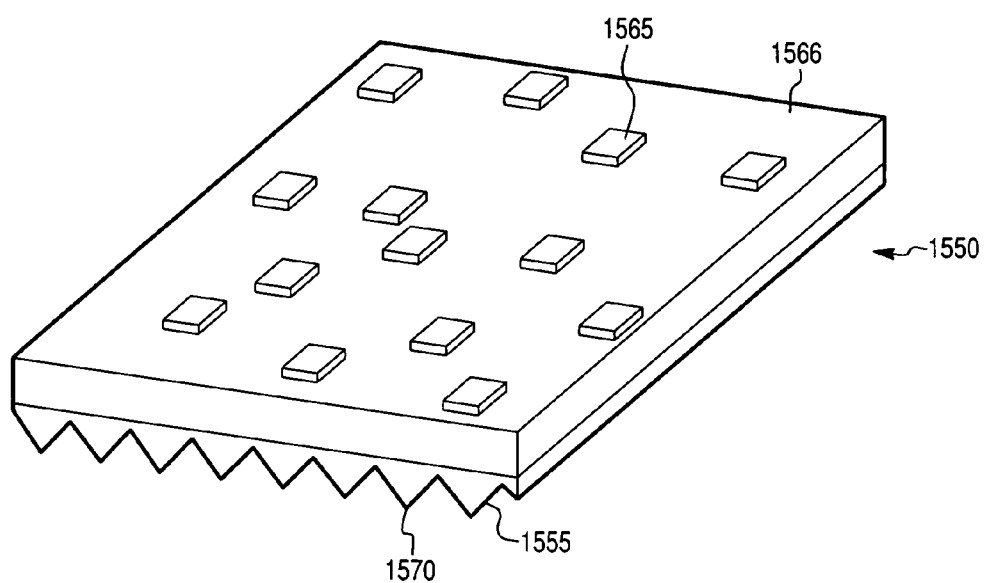
FIG. 52 is a perspective view of an optical substrate according to another embodiment of the invention.

The surface of the substrate opposite to the surface which is randomly or pseudo randomly modulated by the second surface structure function is not limited to a smooth surface. The pseudo-random modulation may be applied to a first surface structure function as defined by one surface shown in the substrate 1550 of FIG. 52, where the opposing surface has a number of bumps thereon. FIG. 52 illustrates a substrate 1550 with one surface 1555, and an opposing surface 1560 with a number of randomly oriented bumps 1565 thereon. Such a substrate is described, for example, in U.S. Pat. No. 5,808,784. The surface 1555 in this case may be a surface of a lens array with a number of prism structures 1570 thereon. According to an aspect of the invention, the first surface structure function as described is modulated by the second surface structure function.

Figure 53:
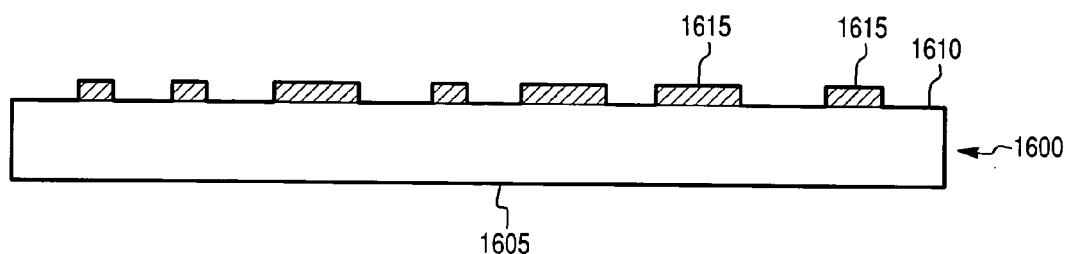
FIG. 53 is a side sectional view of an optical substrate according to another embodiment of the invention.

As another example of where the surface of the substrate opposite to the surface which is randomly or pseudo randomly modulated by the second surface structure function is not limited to a smooth surface is provided as follows. The pseudo-random modulation may be applied to a first surface structure function as defined by the one surface shown in FIG. 53, where the opposing surface has a number of circular or polygonal dots on the opposing surface. FIG. 53 illustrates a substrate 1600 with one surface 1605, and an opposing surface 1610 with a number of circular or polygonal dots 1615 thereon. Such a substrate is described, for example, in WO 99/63394, for example. The first surface structure function is defined by the one surface 1605. According to an aspect of the invention, the first surface structure function as described is modulated by the second surface structure function.

Figure 54:
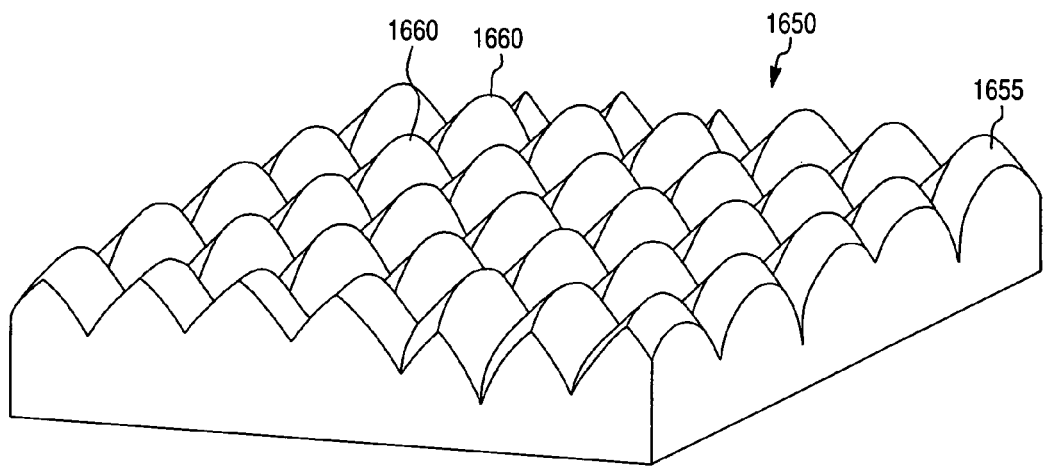
FIG. 54 is a side sectional view of an optical substrate according to another embodiment of the invention.

The pseudo-random modulation may be applied to a first surface structure function as defined by the surface shown in FIG. 54. FIG. 54 illustrates a substrate 1650 with a surface 1655 as shown. Such a substrate is described, for example, in U.S. Pat. No. 6,759,113. The surface 1655 in this case has a plurality of prisms 1660, where the prisms have a curved surface in two orthogonal directions. According to an aspect of the invention, the first surface structure function as described is modulated by the second surface structure function.

Figure 55:
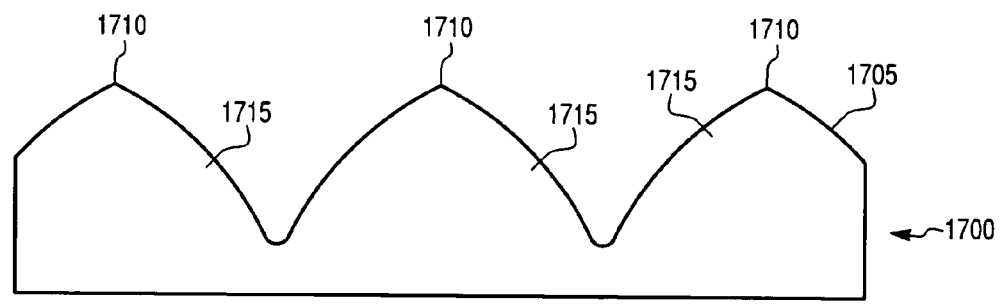
FIG. 55 is a side sectional view of an optical substrate according to another embodiment of the invention.

The pseudo-random modulation may be applied to a first surface structure function as defined by the surface shown in FIG. 55. FIG. 55 illustrates a substrate 1700 with a surface 1705 as shown. Such a substrate is described, for example, in U.S. Patent publication no. 2004/0109663. The surface 1705 in this case has a plurality of prisms 1710, where each prism 1710 has a facet 1715 with a curved cross section. According to an aspect of the invention, the first surface structure function as described is modulated by the second surface structure function.

Figure 56:
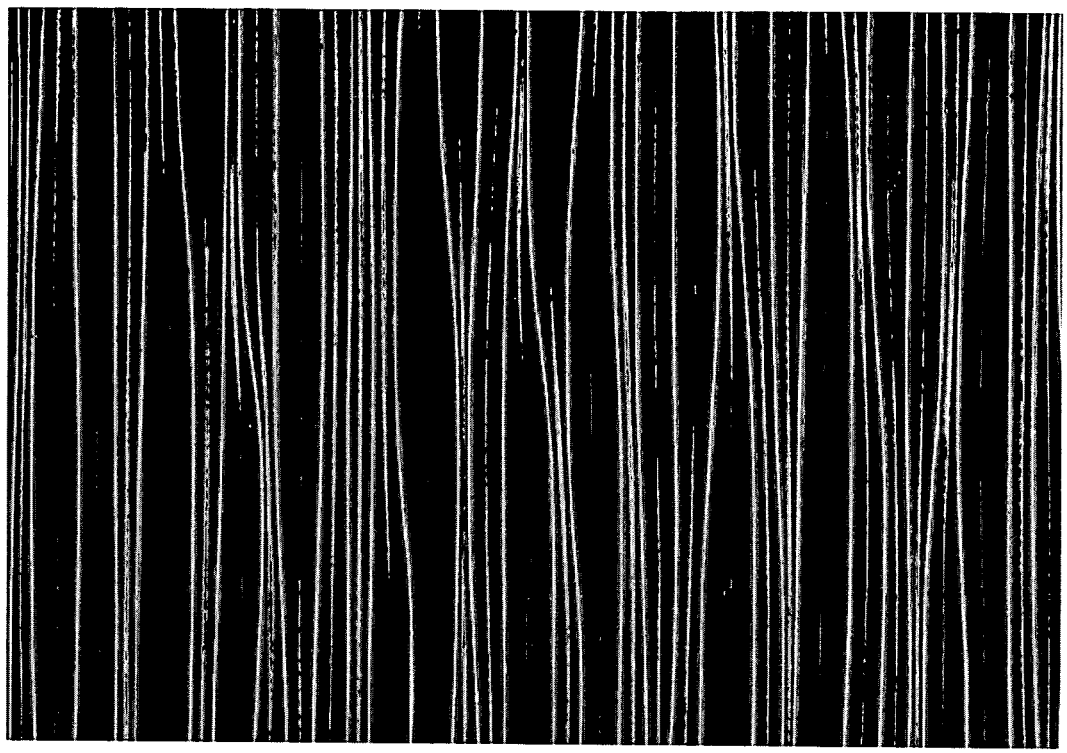
FIG. 56 is a top view of a portion of an optical substrate according to another embodiment of the invention.

FIG. 56 is a top view of a portion of sample of an optical film according to another embodiment of the invention. In this embodiment the substrate has a surface defined by an array of prism structures having an approximately 37 µm pitch (spacing between adjacent peaks of the prism structures). Each of the prism structures extends generally in the horizontal direction parallel to the other prism structures. The position of the prism peaks was modulated in the y-direction (the direction in the plane of the paper in FIG. 56 perpendicular to the x-direction) by approximately 18 µm.

Figure 57:
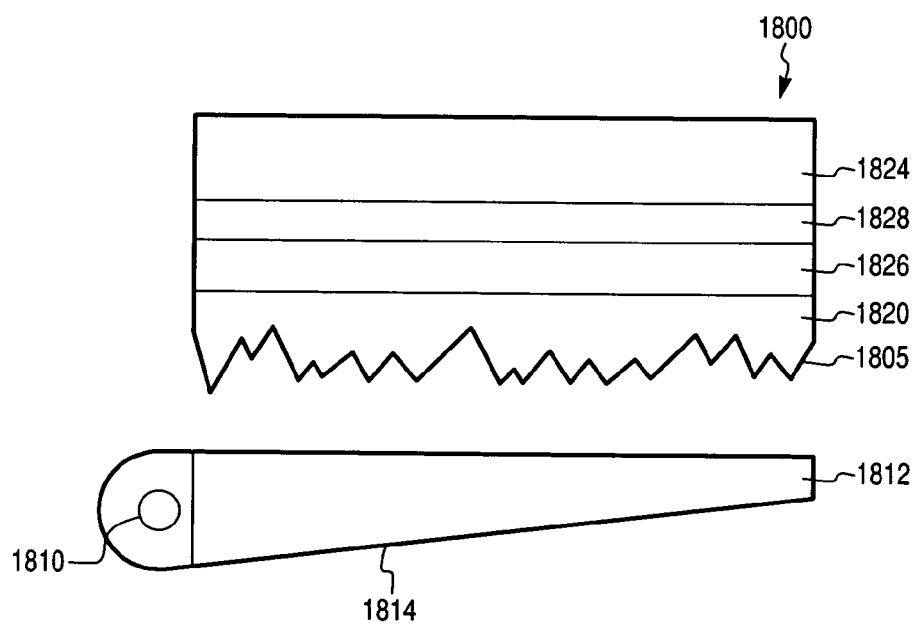
FIG. 57 is a sectional view of a backlight display device.

The pseudo-random modulation may be applied to a surface of a turning film, of a back light display device. FIG. 57 is a schematic of the back light display device 1800. The device 1800 includes an optical source 1810 for generating light, and a light guide 1812 with a reflective surface 1814 that reflects the light guided along the light guide 1812 out of the light guide at an exit surface. The device also includes a turning film 1820 with a light incident surface 1805. The exit surface of the light guide 1812 faces toward the turning film. According to an aspect of the invention, the first surface structure function as shown in FIG. 57 as the light incident surface 1805 is modulated by the second surface structure function which provides pseudo-random modulation. The first surface structure function is defined by a plurality of prisms 1822 that face the light guide 1814. The device 1800 also includes an LCD substrate 1824 and may include polarizers 1826, 1828 between the turning film 1820 and the LCD substrate 1824. The nominal pitch of the prisms may be between 50 µm and 500 µm, for example. The turning film 1820 may be laminated to the LCD substrate.

As mentioned above, in the present discussion specular is defined to mean any component of reflected or transmitted light that that is not diffused on a macroscopic scale. The macroscopic is the bulk behavior that would be observed by interrogating the surface of the substrate with a beam of coherent light with a diameter of about 500 micron or greater. A classic multi-order grating would be considered to have multiple specular components.

Any references to front and back, right and left, top and bottom, upper and lower, and horizontal and vertical are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical substrate, comprising:
   a surface characterized by a correlation function value of less than about 37 percent of an initial value within a correlation length of about 1 cm or less, wherein the surface is defined by a first surface structure function modulated by a second surface structure function, the surface of the optical substrate producing specular and diffuse light from a first input beam of light.

2. The optical substrate as set forth in claim 1, wherein the first surface structure function extends a length from a first end to a second end of the substrate.

3. The optical substrate as set forth in claim 2, wherein the first surface structure function has a sawtooth or triangular cross section.

4. The optical substrate as set forth in claim 1, wherein the surface of the optical substrate comprises a shape that turns and diffuses light to form a plurality of diffusion ellipses each with a power half angle between about 0.1 and about 60 degrees.

5. The optical substrate as set forth in claim 4, wherein the power half angle is between about 1 and about 5 degrees.

6. The optical substrate as set forth in claim 4, wherein a first input beam of light has a first angle of incidence and the surface of the optical substrate is shaped so that the first input beam of light is transmitted through the optical substrate and turned by the surface of the optical substrate to an output angle different from the first angle of incidence.

7. The optical substrate as set forth in claim 6, wherein the output angles of the specular components are determined by the first surface structure function.

8. The optical substrate as set forth in claim 7, wherein a second input beam of light normal to the optical substrate is substantially reflected by the surface of the optical substrate and forms output specular components with a power half angle between about 0.1 and about 60 degrees.

9. The optical substrate as set forth in claim 8, wherein the correlation length is about 200 microns or less.

10. A brightness enhancement film, comprising:
a surface characterized by a correlation length of about 1 cm or less, the surface having a shape to turn and diffuse incident light to produce at least a 30 percent brightness increase on-axis to a viewer, wherein the surface produces diffused components of light with a power half angle between about 0.1 and 60 degrees.

11. The film as set forth in claim 10, wherein the surface is characterized by a correlation length of about 200 microns or less.

12. The film as set forth in claim 10, wherein the brightness increase on-axis is about 30 percent to about 300 percent.

13. The film as set forth in claim 10, wherein the brightness increase on-axis is about 50 percent to about 200 percent.

14. An optical substrate, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function;
wherein the three-dimensional surface has a correlation function value of less than about 37 percent of an initial correlation function value in a correlation length of about 1 cm or less.

15. The optical substrate as set forth in claim 14, wherein the surface is characterized by a correlation length of about 200 microns or less.

16. The optical substrate as set forth in claim 14, wherein the first surface structure function is characterized by a series of first surface structure functions, each first surface structure function having a length, width and peak angle.

17. The optical substrate as set forth in claim 14, wherein the surface diffuses and turns the input beam of light to form a plurality of diffusion ellipses each with a power half angle between about 0.1 and about 60 degrees.

18. The optical substrate as set forth in claim 17, wherein the power half angle is between about 1 and about 5 degrees.

19. The optical substrate as set forth in claim 17, wherein the input beam of light has an angle of incidence and the surface is structured so that the input beam of light is transmitted through the optical substrate and turned by the surface to form output angles of the specular components that are different from the angle of incidence.

20. The optical substrate as set forth in claim 19, wherein the output angles of the specular components are determined by the first surface structure function.

21. An optical substrate, comprising:
a surface characterized by a correlation function value of less than about 37 percent of an initial value within a correlation length of about 1 cm or less, wherein the surface is defined by a first surface structure function having a sawtooth or triangular cross section extending a length from a first end to a second end of the substrate modulated by a second function, the surface of the optical substrate producing specular and diffuse light from a first input beam of light.

22. A brightness enhancement film, comprising:
a surface characterized by a correlation length of about 1 cm or less, the surface having a shape to turn and diffuse incident light to produce a 50 percent to 200 percent brightness increase on-axis to a viewer, wherein the surface produces diffused components of light with a power half angle between about 0.1 and 60 degrees.

23. An optical substrate, comprising:
a three-dimensional surface defined by a first surface structure function and a second surface structure function, the first surface structure function having a length, width and peak angle with optical characteristics to produce at least one output specular component from an input beam of light;
the second surface structure function having a geometry with at least pseudo-random characteristics to modulate the first surface structure function in one or more of frequency, phase and peak angle along the length of the first surface structure function;
wherein the three-dimensional surface has a correlation function value of less than about 37 percent of an initial correlation function value in a correlation length of about 1 cm or less.

24. A backlight display device comprising:
an optical source for generating light;
a light guide for guiding the light therealong including a reflective surface for reflecting the light out of the light guide;
at least one optical substrate receptive of the light from the reflective surface, the optical substrate comprising:
a three-dimensional surface defined by a first surface structure function and a second surface structure function,
the first surface structure function having a length, width and peak angle with optical characteristics to produce at least one output specular component from an input beam of light;
the second surface structure function having a geometry with at least pseudo-random characteristics to modulate the first surface structure function in one or more of frequency, phase and peak angle along the length of the first surface structure function, the phase being a horizontal peak position along the width;
wherein the three-dimensional surface has a correlation function value of less than about 37 percent of an initial correlation function value in a correlation length of about 1 cm or less.

25. The backlight display device as set forth in claim 24 wherein the at least one optical substrate comprises a plurality of optical substrates.

26. The backlight display device as set forth in claim 25 wherein the plurality of optical substrates include first and second surface functions in a relative orientation from zero to ninety degrees with respect to one another.

27. The backlight display device as set forth in claim 26 wherein the relative orientation of the first and second surface functions is parallel or perpendicular with respect to one another.

28. A backlight display device comprising:
an optical source for generating light;
a light guide for guiding the light therealong including a reflective surface for reflecting the light out of the light guide; and
an optical substrate receptive of the light from the reflective surface, the optical substrate comprising:
a first three-dimensional surface defined by first and second surface structure functions; the first surface structure function having a length, width and peak angle with optical characteristics to produce at least one output specular component from an input beam of light;
the second surface structure function having a geometry with at least pseudo-random characteristics to modulate the first surface structure function in one or more of frequency, phase and peak angle along the length of the first surface structure function, the phase being a horizontal peak position along the width of the first surface structure function;
a second three-dimensional surface opposing the first three-dimensional surface and defined by a third surface structure function and a fourth surface structure function; the third surface structure function having a length, width and peak angle with optical characteristics to produce at least one output specular component from an input beam of light;
the fourth surface structure function having a geometry with at least pseudo-random characteristics to modulate the third surface structure function in one or more of frequency, phase and peak angle along the length of the first surface structure function, the phase being a horizontal peak position along the width of the third surface structure function;
wherein the first and second three-dimensional surfaces have a correlation function value of less than about 37 percent of an initial correlation function value in a correlation length of about 1 cm or less.

29. The backlight display device as set forth in claim 28 wherein the first and second surface structure functions are in a relative orientation from zero to ninety degrees with respect to one another.

30. The backlight display device as set forth in claim 29 wherein the relative orientation of the first and third surface structure functions is parallel or perpendicular with respect to one another.

31. The optical substrate as set forth in claim 1 wherein the first surface function is a triangle with a width of approximately 40 µm and a height of between 1 µm and 200 µm.

32. The optical substrate as set forth in claim 1 wherein the first surface function is a triangle with a width of approximately 40 µm and a height of approximately 18 µm.

33. The optical substrate as set forth in claim 1 wherein the first surface function is a triangle with a base to height ratio of between 40 to 1 and 1 to 10.

34. The optical substrate as set forth in claim 1 wherein the first surface function is a triangle with a base to height ratio approximately 40 to 18.

35. The optical substrate as set forth in claim 1 wherein the surface of the optical substrate is formed with an optically transparent material with an index of refraction of between 1.1 and 3.0.

36. The optical substrate as set forth in claim 1 wherein the surface of the optical substrate is formed with an optically transparent material with an index of refraction of approximately 1.75.

37. The optical substrate as set forth in claim 32 wherein the surface of the optical substrate is formed with an optically transparent material with an index of refraction of approximately 1.75.

38. The optical substrate as set forth in claim 28 wherein the second surface is optically smooth or planar.

39. The optical substrate as set forth in claim 28 wherein the second surface has a matte or diffuse finish.

40. The optical substrate as set forth in claim 39 wherein the second surface has diffusion characteristics that are anamorphic or anisotropic.

41. The optical substrate as set forth in claim 28 wherein the second surface is optically smooth or planar including a pattern of protrusions formed either in the substrate or attached with an adhesive.

42. The optical substrate as set forth in claim 1, wherein the second surface structure function has a geometry with at least pseudo-random characteristics to modulate the first surface structure function in one or more of frequency and peak angle along the length of the first surface structure function.

43. The brightness enhancement film as set forth in claim 10, wherein the second surface structure function has a geometry with at least pseudo-random characteristics to modulate the first surface structure function in one or more of frequency and peak angle along the length of the first surface structure function.

44. The optical substrate as set forth in claim 14, wherein the second surface structure function has a geometry with at least pseudo-random characteristics to modulate the first surface structure function in one or more of frequency and peak angle along the length of the first surface structure function.

45. The optical substrate as set forth in claim 21, wherein the second surface structure function has a geometry with at least pseudo-random characteristics to modulate the first surface structure function in one or more of frequency and peak angle along the length of the first surface structure function.

46. The brightness enhancement film as set forth in claim 22, wherein the second surface structure function has a geometry with at least pseudo-random characteristics to modulate the first surface structure function in one or more of frequency and peak angle along the length of the first surface structure function.

47. The optical substrate as set forth in claim 23, wherein the second surface structure function has a geometry with at least pseudo-random characteristics to modulate the first surface structure function in one or more of frequency and peak angle along the length of the first surface structure function.

48. The backlight display device as set forth in claim 28, wherein the second surface structure function has a geometry with at least pseudo-random characteristics to modulate the first surface structure function in one or more of frequency and peak angle along the length of the first surface structure function, and wherein the fourth surface structure function has a geometry with at least pseudo-random characteristics to modulate the third surface structure function in one or more of frequency and peak angle along the length of the third surface structure function.

49. The optical substrate of claim 16, wherein the optical substrate comprises a brightness enhancement film.

50. An optical substrate, comprising:
a three-dimensional surface defined by a first surface structure function and a second surface structure function, the first surface structure function having a geometry with optical characteristics to produce at least one output specular component from an input beam of light,
the second surface structure function having a geometry with at least pseudo-random characteristics to modulate the first surface structure function such that the surface of the optical substrate producing specular and diffuse light from the input beam of light, wherein the second surface structure function modulates the first surface structure function in two orthogonal directions.

51. A light display comprising:
a light flux paralizer providing light;
an exit light direction modifier having a light exit surface opposite to the light flux paralizer, and a light incident surface towards the light flux paralizer to receive light from the light flux paralizer,
the light incident surface defined by a first surface structure function and a second surface structure function, the first surface structure function having a geometry with optical characteristics to produce at least one output specular component from the received light, the first surface structure function defining a plurality of prism surfaces,
the second surface structure function having a geometry with at least pseudo-random characteristics to modulate the first surface structure function such that the light incident surface producing specular and diffuse light from the received light.

52. An optical substrate, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function such that the surface of the optical substrate producing specular and diffuse light from the input beam of light,
wherein the first surface structure function is defined as a surface of a plurality of first prisms having a first prism configuration and a plurality of second prisms having a second configuration different from the first prism configuration.

53. An optical substrate, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function such that the surface of the optical substrate producing specular and diffuse light from the input beam of light,
wherein the first surface structure function is defined as a surface having a first region having multiple peaks with a first average peak height, and a second region having multiple peaks with a second average peak height different from the first average peak height.

54. A brightness enhancement film, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function such that the surface of the brightness enhancement film producing specular and diffuse light from the input beam of light,
wherein the first surface structure function is defined as a surface with pairs of side by side prisms, each pair having first and second prisms, and each prism having a prism angle and a valley angle wherein either said prism angle or said valley angle of each pair, but not both, are equal.

55. An optical substrate, comprising:
an anti-wet-out surface; and
a three-dimensional surface opposite the anti-wet-out surface, the three-dimensional surface defined by a first surface structure function and a second surface structure function, the first surface structure function having a geometry with optical characteristics to produce at least one output specular component from an input beam of light,
the second surface structure function having a geometry with at least pseudo-random characteristics to modulate the first surface structure function such that the surface of the optical substrate producing specular and diffuse light from the input beam of light, and
wherein the first surface structure function is defined as a surface with multiple prisms.

56. An optical substrate, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function such that the surface of the optical substrate producing specular and diffuse light from the input beam of light, the first surface structure function defining a plurality of prisms each having a slope wherein the second surface structure function modulates the slope.

57. An optical substrate, comprising:
a three-dimensional surface defined by a first surface structure function and a second surface structure function, the first surface structure function having a geometry with optical characteristics to produce at least one output specular component from an input beam of light,
the second surface structure function having a geometry with at least pseudo-random characteristics to modulate the first surface structure function such that the surface of the optical substrate producing specular and diffuse light from the input beam of light, the first surface structure function defined as a surface of a lenslet array.

58. An optical substrate, comprising:
a three-dimensional surface defined by a first surface structure function and a second surface structure function, the first surface structure function having a geometry with optical characteristics to produce at least one output specular component from an input beam of light;
the second surface structure function having a geometry with at least pseudo-random characteristics to modulate the first surface structure function such that the surface of the optical substrate producing specular and diffuse light from the input beam of light, wherein the first surface structure function is defined as a surface of a plurality of first prisms, each of the first prisms having a first prism angular orientation, and a plurality of second prisms, each of the second prisms having a second prism angular orientation different from the first prism angular orientation.

59. An optical substrate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined as surface of a plurality of prism structures extending generally in a first direction, having a spacing in a second direction perpendicular to the first direction between adjacent prismatic structures, and having a height varying in the first direction.

60. A display device comprising:

a backlight for providing light; and an optical film receptive of the light from the backlight, the optical film comprising:

a three-dimensional surface defined by a first surface structure function and a second surface structure function, the first surface structure function having a geometry with optical characteristics to produce at least one output specular component from the light received from the backlight, the second surface structure function having a geometry with at least pseudo-random characteristics to modulate the first surface structure function such that the surface of the optical substrate producing specular and diffuse light from the light received from the backlight, wherein the optical film includes beads therein to produce diffuse light from the light received from the backlight.

61. An optical substrate, comprising:

an optical film having a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light; and a metal layer on the optical film.

62. An optical substrate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined by the surface of a non-ordered arrangement of prisms.

63. An optical substrate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined by the surface of a plurality of refraction prisms and a plurality reflection prisms.

64. An optical substrate, comprising:

an optical film comprising:

a first surface having a plurality of randomly oriented bumps, and a second three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined by the surface of a lens array.

65. A light guide plate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the light guide plate producing specular and diffuse light from the input beam of light; and a surface opposite the three-dimensional surface having a plurality of circular or polygonal dots.

66. A light guide plate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the light guide plate producing specular and diffuse light from the input beam of light, wherein the first surface structure function is defined by a surface of a plurality of prisms, the prisms have a curved surface in two orthogonal directions.

67. An optical substrate, comprising:

a three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined by a surface of a plurality of prisms, each prisms having a facet with a curved cross section.

68. A backlight display device comprising:

an optical source for generating light;

a light guide for guiding the light therealong including an exit surface for light exiting out of the light guide;

a turning film having a three dimensional surface receptive of the light from the exit surface, the exit surface facing toward the tuning film, the three-dimensional surface defined by a first surface structure function and a second surface structure function, the first surface structure function having a geometry with optical characteristics to produce at least one output specular component from an input beam of light, the second surface structure function having a geometry with at least pseudo-random characteristics to modulate the first surface structure function such that the surface of the optical substrate producing specular and diffuse light from the input beam of light, wherein the first surface structure function is defined by a surface of a plurality of prisms.

69. The backlight display device of claim 68 wherein the prisms have a nominal pitch between 50 µm and 500 µm.

70. The backlight display device of claim 68 wherein the turning film is laminated to a liquid crystal substrate.

* * * * *